United States Patent
Otsuki et al.

(10) Patent No.: US 9,343,737 B2
(45) Date of Patent: May 17, 2016

(54) HYDROGEN-ABSORBING ALLOY POWDER, NEGATIVE ELECTRODE, AND NICKEL HYDROGEN SECONDARY BATTERY

(75) Inventors: Takayuki Otsuki, Kobe (JP); Akiyasu Ota, Kobe (JP); Toshio Irie, Kobe (JP); Yasunori Yanagi, Kobe (JP)

(73) Assignee: SANTOKU CORPORATION, Kobe (JP)

( * ) Notice: Subject to any disclaimer, the term of this patent is extended or adjusted under 35 U.S.C. 154(b) by 84 days.

(21) Appl. No.: 13/994,926

(22) PCT Filed: Dec. 19, 2011

(86) PCT No.: PCT/JP2011/079385
§ 371 (c)(1),
(2), (4) Date: Jun. 17, 2013

(87) PCT Pub. No.: WO2012/081724
PCT Pub. Date: Jun. 21, 2012

(65) Prior Publication Data
US 2013/0272918 A1 Oct. 17, 2013

(30) Foreign Application Priority Data
Dec. 17, 2010 (JP) .................. 2010-294761

(51) Int. Cl.
| | | |
|---|---|---|
| *H01M 4/38* | (2006.01) | |
| *C22C 19/00* | (2006.01) | |
| *C22F 1/00* | (2006.01) | |
| *C22F 1/10* | (2006.01) | |
| *C22C 1/04* | (2006.01) | |
| *H01M 10/34* | (2006.01) | |

(52) U.S. Cl.
CPC ............ *H01M 4/385* (2013.01); *C22C 1/0433* (2013.01); *C22C 19/00* (2013.01); *C22F 1/00* (2013.01); *C22F 1/10* (2013.01); *H01M 4/383* (2013.01); *H01M 10/345* (2013.01)

(58) Field of Classification Search
CPC ...... H01M 4/383; H01M 4/385; C22C 19/03; C22C 19/00; Y02E 60/327; B22F 9/04; C01B 3/0057
USPC ..................................... 429/218.2
See application file for complete search history.

(56) References Cited

U.S. PATENT DOCUMENTS

| | | |
|---|---|---|
| 5,354,576 A | 10/1994 | Zhang et al. |
| 2005/0056349 A1 | 3/2005 | Yasuoka et al. |
| 2005/0112018 A1* | 5/2005 | Schulz et al. ............. 420/455 |

FOREIGN PATENT DOCUMENTS

| | | |
|---|---|---|
| CN | 1062057 A | 6/1992 |
| CN | 1595685 A | 3/2005 |
| JP | 2002-69554 A | 3/2002 |
| JP | 2005-108816 A | 4/2005 |
| JP | 2007-63597 A | 3/2007 |
| JP | 2009-64698 A | 3/2009 |

OTHER PUBLICATIONS

International Searching Authority, International Search Report for PCT/JP2011/079385 dated Mar. 13, 2012.

* cited by examiner

*Primary Examiner* — Weiping Zhu
(74) *Attorney, Agent, or Firm* — Sughrue Mion, PLLC

(57) ABSTRACT

Provided are hydrogen storage alloy powder capable of providing a nickel-hydrogen rechargeable battery with simultaneous excellence in initial activity, discharge capacity, and cycle characteristics, which are otherwise in a trade-off relationship, an anode for a nickel-hydrogen rechargeable battery as well as a nickel-hydrogen rechargeable battery employing the same. The hydrogen storage alloy has a particular composition represented by formula (1), $R_{1-a}Mg_aNi_bAl_cM_d$, and has at its outermost surface a Mg-rich/Ni-poor region having a composition with a Mg molar ratio higher than that in formula (1) and a Ni molar ratio lower than that in formula (1), and has inside a Mg/Ni-containing region having a composition with a Mg molar ratio lower than and a Ni molar ratio higher than those in the Mg-rich/Ni-poor region.

14 Claims, 8 Drawing Sheets

HYDROGEN-ABSORBING ALLOY POWDER, NEGATIVE ELECTRODE, AND NICKEL HYDROGEN SECONDARY BATTERY

CROSS REFERENCE TO RELATED APPLICATIONS

This application is a National Stage of International Application No. PCT/JP2011/079385 filed Dec. 19, 2011, claiming priority based on Japanese Patent Application No. 2010-294761 filed Dec. 17, 2010, the contents of all of which are incorporated herein by reference in their entirety.

FIELD OF ART

The present invention relates to a hydrogen storage alloy powder, an anode for a nickel-hydrogen rechargeable battery, and a nickel-hydrogen rechargeable battery.

BACKGROUND ART

A nickel-hydrogen rechargeable battery with an anode containing a hydrogen storage alloy has a higher energy density than a nickel-cadmium rechargeable battery, and places only a small burden on the environment due to absence of toxic Cd. Nickel-hydrogen rechargeable batteries are used in portable devices such as digital cameras and electric tools as well as in electric vehicles and hybrid electric vehicles. Various battery characteristics are desired depending on their applications.

As an anode material for a nickel-hydrogen rechargeable battery, there have been used a $LaNi_5$ type hydrogen storage alloy, which is a rare earth-Ni intermetallic compound having $CaCu_5$ crystal structure as the main phase, and a hydrogen storage alloy containing Ti, Zr, V, and Ni as constituent elements and having a Laves crystal structure as the main phase.

Rare earth-Mg—Ni based hydrogen storage alloys have recently been put into practical use. Nickel-hydrogen rechargeable batteries employing this alloy as an anode material are known to have a large capacity.

Patent Publication 1 reports that surface acid treatment of a hydrogen storage alloy containing rare earths, nickel, magnesium, and aluminum provides a hydrogen storage alloy having a higher surface content of each of the nickel, magnesium, and aluminum elements with respect to the total rare earths compared to the corresponding content inside the alloy. The publication discloses that a nickel-hydrogen rechargeable battery employing such a hydrogen storage alloy in its anode has high rate discharge performance at low temperatures, and is inhibited from decrepitation due to alloy cracking resulting from charging/discharging, to prevent deterioration of the cycle life.

Patent Publication 2 discloses that charge/discharge reaction in an alkaline aqueous solution of a nickel-hydrogen battery fabricated with an electrode containing La—Mg—Ni based hydrogen storage alloy particles and Sn, results in Sn-containing and Mg-containing compounds precipitated on the alloy particle surfaces, which increases the discharge capacity and improves the cycle characteristics of the nickel-hydrogen battery.

Patent Publication 1: JP-2007-63597-A
Patent Publication 2: JP-2009-64698-A

SUMMARY OF THE INVENTION

The nickel-hydrogen rechargeable batteries employing the hydrogen storage alloys disclosed in Patent Publications 1 and 2, however, have not accomplished simultaneous satisfaction of the initial activity, discharge capacity, and cycle characteristics.

It is an object of the present invention to provide hydrogen storage alloy powder that is capable of providing a nickel-hydrogen rechargeable battery with simultaneous excellent in initial activity, discharge capacity, and cycle characteristics, which properties have conventionally been in a trade-off relationship.

It is another object of the present invention to provide a nickel-hydrogen rechargeable battery that is excellent in all of initial activity, discharge capacity, and cycle characteristics, as well as an anode for such a rechargeable battery.

According to the present invention, there is provided hydrogen storage alloy powder of a composition represented by formula (1):

$$R_{1-a}Mg_aNi_bAl_cM_d$$

wherein R stands for at least one element selected from rare earth elements including Sc and Y, Zr, Hf, and Ca; M stands for at least one element selected from elements other than R, Mg, Ni, and Al, a satisfies $0.005 \le a \le 0.40$, b satisfies $3.00 \le b \le 4.50$, c satisfies $0 \le c \le 0.50$, d satisfies $0 \le d \le 1.00$, and b+c+d satisfies $3.00 \le b+c+d \le 4.50$, wherein said alloy powder has at its outermost surface a Mg-rich/Ni-poor region having a composition with a Mg molar ratio higher than that in formula (1) (value represented by a in formula (1)) and a Ni molar ratio lower than that in formula (1) (value represented by b in formula (1)), and has inside a Mg/Ni-containing region having a composition with a Mg molar ratio lower than that of said Mg-rich/Ni-poor region and a Ni molar ratio higher than that of said Mg-rich/Ni-poor region.

According to the present invention, there are also provided an anode for a nickel-hydrogen rechargeable battery employing the above-mentioned hydrogen storage alloy powder, and a nickel-hydrogen rechargeable battery employing the anode.

The hydrogen storage alloy powder according to the present invention (sometimes referred to as the alloy powder hereinbelow) has the particular composition, the particular Mg-rich/Ni-poor region at its outermost surface, and the particular Mg/Ni-containing region inside the alloy powder, so that, when the alloy powder is used in an anode of a nickel-hydrogen rechargeable battery, the initial activity, discharge capacity, and cycle characteristics of the rechargeable battery are all improved concurrently.

EMBODIMENTS OF THE INVENTION

Figure 1:
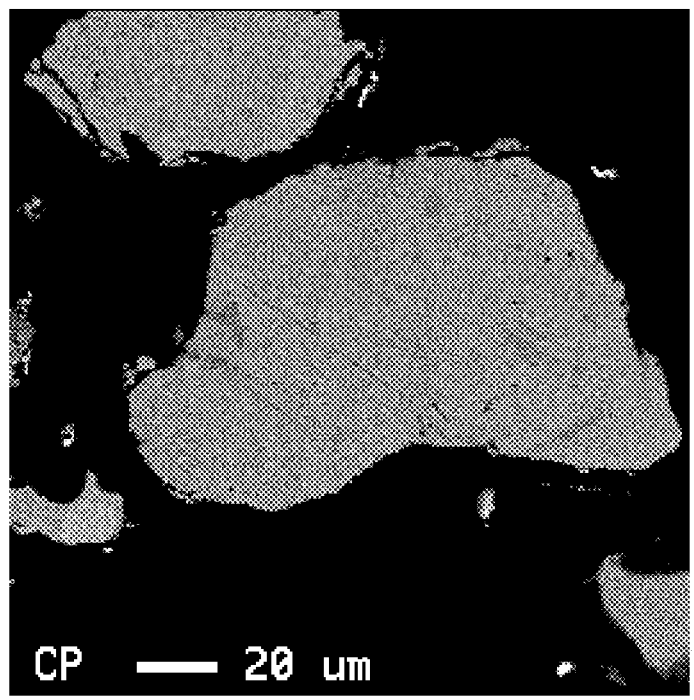
FIG. 1 is a photocopy of a Comp image of a sectional structure of the hydrogen storage alloy powder prepared in Example 1.

The present invention will now be explained in detail.

The alloy composition of the hydrogen storage alloy powder according to the present invention is represented by formula (1):

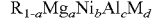

$$R_{1-a}Mg_aNi_bAl_cM_d$$

In formula (1), R stands for at least one element selected from rare earth elements including Sc and Y, Zr, Hf, and Ca. It is particularly preferred that one, two or more of La, Nd, Pr, Sm, Y, and Zr are contained. La tends to lower the equilibrium pressure of the alloy upon hydrogen absorption/desorption, whereas Nd, Pr, Sm, Y, and Zr tend to raise the same.

In formula (1), 1-a denotes the content of R, and satisfies $0.60 \leq 1-a \leq 0.995$, preferably $0.75 \leq 1-a \leq 0.99$, more preferably $0.85 \leq 1-a \leq 0.99$.

In formula (1), a denotes the content of Mg, and satisfies $0.005 \leq a \leq 0.40$, preferably $0.01 \leq a \leq 0.25$, more preferably $0.01 \leq a \leq 0.15$. At a lower Mg content, sufficient hydrogen storage capacity is not attained and, when the alloy is used for a rechargeable battery, the discharge capacity of the battery may be low. At a higher Mg content, sufficient corrosion resistance is not attained and, when the alloy is used for a rechargeable battery, the cycle characteristics of the battery may be poor. Mg tends to increase the hydrogen storage capacity, and to raise the equilibrium pressure of the alloy powder upon hydrogen absorption/desorption.

In formula (1), b denotes the content of Ni, and satisfies $3.00 \leq b \leq 4.50$, preferably $3.00 \leq b \leq 4.00$, more preferably $3.00 \leq b \leq 3.80$. At a lower Ni content, decrepitation is apt to proceed and, when the alloy is used for a rechargeable battery, the cycle characteristics of the battery may be low. At a higher Ni content, sufficient hydrogen storage capacity is not attained and, when the alloy is used for a rechargeable battery, sufficient discharge capacity may not be attained.

In formula (1), c denotes the content of Al, and satisfies $0 \leq c \leq 0.50$, preferably $0.05 \leq c \leq 0.50$, more preferably $0.05 \leq c \leq 0.30$. Al is not indispensable but, improves corrosion resistance when contained. When the alloy is used for a rechargeable battery, Al contributes to improvement in cycle characteristics of the battery. Al also tends to lower the equilibrium pressure of the alloy powder upon hydrogen absorption/desorption and, when the alloy is used for a rechargeable battery, contributes to improvement in the initial capacity. On the other hand, at a higher Al content, sufficient hydrogen storage capacity is not attained, and Al segregation may obstruct sufficient corrosion resistance.

In formula (1), M stands for at least one element selected from elements other than R, Mg, Ni, and Al, and may be any element that contributes to fine adjustment of characteristics of a battery depending on its application. Specific examples of element M may be at least one element selected from Ti, V, Nb, Ta, Cr, Mo, W, Mn, Fe, Co, Cu, Zn, B, Ga, Sn, Sb, In, C, Si, and P, preferably at least one element selected from Ti, Nb, Mo, W, Mn, Fe, Co, Cu, B, and Sn. For example, with at least one element selected from Ti, Nb, Mo, W, Fe, Cu, Sn, and B, decrepitation may be inhibited or elution of Al into an electrolyte may be inhibited.

In formula (1), d denotes the content of element M, and satisfies $0 \leq d \leq 1.00$, preferably $0 \leq d \leq 0.50$. Element M is not indispensable, but may be contained when fine adjustment of battery characteristics is desired depending on the application of the battery.

In formula (1), b+c+d denotes the content of the components other than R and Mg. These components primarily affect decrepitation and, when the alloy is used for a rechargeable battery, contribute to improvement in cycle characteristics of the battery. b+c+d satisfies $3.00 \leq b+c+d \leq 4.50$, preferably $3.00 \leq b+c+d \leq 4.00$, more preferably $3.00 \leq b+c+d \leq 3.80$.

In the present invention, the composition of the alloy powder is confirmed by quantitative analysis with ICP (Inductively Coupled Plasma).

The hydrogen storage alloy powder according to the present invention has, at its outermost surface, a Mg-rich/Ni-poor region having a composition with a Mg molar ratio higher than that in formula (1) (value represented by a in formula (1)) and a Ni molar ratio lower than that in formula (1) (value represented by b in formula (1)), and has, inside, a Mg/Ni-containing region having a composition with a Mg molar ratio lower than that of the Mg-rich/Ni-poor region and a Ni molar ratio higher than that of the Mg-rich/Ni-poor region.

When Al is contained in the hydrogen storage alloy powder of the present invention, the content thereof in the Mg-rich/Ni-poor region is arbitrary, and the region preferably has a composition with an Al molar ratio higher than that in formula (1) (value represented by c in formula (1)). The Al content in the Mg/Ni-containing region is also arbitrary, and the region preferably has a region having a composition with an Al molar ratio lower than that in the Mg-rich/Ni-poor region.

It is assumed that, with the Mg-rich/Ni-poor region being present at the outermost surface of the alloy powder, hydrogen migrates smoothly between the Mg-rich/Ni-poor region and the inside of the alloy powder. As a result, when the alloy is used for a rechargeable battery, excellent initial activity, discharge capacity, and cycle characteristics of the battery may all be attained concurrently.

The Mg-rich/Ni-poor region has a composition with a Mg molar ratio usually not less than 1.05 times and not more than 1.90 times, preferably not less than 1.05 times and not more than 1.50 times the Mg molar ratio in formula (1), and a Ni molar ratio usually not less than 0.45 times and not more than 0.95 times, preferably not less than 0.50 times and not more than 0.95 times the Ni molar ratio in formula (1).

The Mg-rich/Ni-poor region is usually present not all over but partially over the outermost surface of the alloy powder. It is assumed that, with this particular structure, the boundaries between the Mg-rich/Ni-poor region and the remaining region on the outermost surface of the alloy powder act to smoothen the hydrogen migration between the Mg-rich/Ni-poor region and the inside of the alloy powder.

The Mg-rich/Ni-poor region exists as a region having a thickness of usually not less than 1 µm and not more than 40 µm, preferably not less than 2 µm and not more than 40 µm, as measured from the outermost surface toward the center of the alloy powder. The long axis diameter of the Mg-rich/Ni-poor region is preferably not less than 5 µm and not more than 60 µm. The proportion of the Mg-rich/Ni-poor region in the circumferential length of the alloy powder is preferably 1 to 60%, more preferably 1 to 30%.

The Mg-rich/Ni-poor region and the Mg/Ni-containing region are confirmed using an elemental mapping of Mg obtained by observation of a sectional surface of the hydrogen storage alloy powder in FE (Field Emission)-EPMA (Electron Probe Micro Analyzer) at a magnification of 350×. The contrast, level, and the like parameters of the Mg elemental mapping image are adjusted to emphasize the contrasting densities of Mg. When a region at the outermost surface of the alloy powder is observed to have a Mg concentration higher than that of the inside of the alloy powder, that region as well as a region deeper inside than that region is quantitatively analyzed for the elements contained in the alloy powder at an accelerating voltage of 15 kV, sample current of $5.0 \times 10^{-8}$ A, beam diameter φ of not larger than 1 µm and in scan-off. When the Mg and Ni molar ratios in these regions are found to fall within the above-mentioned ranges, respectively, the regions are confirmed to be the Mg-rich/Ni-poor region and the Mg/Ni-containing region, respectively.

The thickness from the outermost surface and the long axis diameter of the Mg-rich/Ni-poor region may be determined by randomly selecting five particles from the alloy powder having the Mg-rich/Ni-poor region observed on the sectional surface of the alloy powder as mentioned above, determining the maximum thicknesses and the long axis diameters of all the Mg-rich/Ni-poor regions present on the alloy powder surfaces, and taking an average for each. The proportion of the Mg-rich/Ni-poor region in the circumferential length of the outermost surface is calculated by adding up the lengths of the Mg-rich/Ni-poor regions occupying the circumferential lengths of the same five particles, and dividing the sum with the total of the circumferential lengths of the five particles.

The Mg-rich/Ni-poor region is assumed to be a phase mainly composed of any of the $MgZn_2$ type crystal structure, $MgCu_2$ type crystal structure (the two may sometimes be referred to collectively as the 1-2 phase hereinbelow), $CeNi_3$ type crystal structure, $PuNi_3$ type crystal structure (the two may sometimes be referred to collectively as the 1-3 phase hereinbelow), $Ce_2Ni_2$ type crystal structure, $Gd_2Co_7$ type crystal structure (the two may sometimes be referred to collectively as the 2-7 phase), or a crystal structure similar to these. The crystal structure of the Mg/Ni-containing region is assumed to be composed mainly of any of the 1-3 phase, the 2-7 phase, $Ce_5Ni_{19}$ type crystal structure, $Pr_5Co_{19}$ type crystal structure (the two may sometimes be referred to collectively as the 5-19 phase hereinbelow), or a crystal structure similar to these. These crystal structures are presumed to be formed by partial substitution of the atoms at the B-site of the unit cell of the $CaCu_5$ type crystal structure (sometimes referred to as the 1-5 phase hereinbelow) with the atoms of the A-site to generate an antiphase boundary, which is a kind of stacking fault, in the crystal structure. It is assumed that the hydrogen storage alloy powder of the present invention has crystal structures wherein the B-site becomes richer from the Mg-rich/Ni-poor region at the outermost surface toward inside of the alloy powder (including the Mg/Ni-containing region). For example, when the Mg-rich/Ni-poor region is mainly of the 1-2 phase or a crystal structure similar to this, the crystal structure inside the alloy powder is assumed to vary through the phases mainly of the 1-3, 2-7, and 5-19 phases toward the 1-5 phase when observed from near the Mg-rich/Ni-poor region into deeper inside the alloy powder. Such variation of the crystal structures from the surface toward the center is assumed to be one of the causes for smooth hydrogen absorption/desorption. It is also assumed that the variation acts to relieve the strain generated upon expansion/contraction of the alloy powder due to hydrogen absorption/desorption. These are assumed to result in the simultaneous excellence in initial activity, discharge capacity, and cycle characteristics when the alloy powder is used for a rechargeable battery.

The above-mentioned crystal structures are deduced from the results of the quantitative analyses in FE-EPMA of each element in the Mg-rich/Ni-poor region and the inside of the alloy powder. For example, according to the results in Example 18 to be discussed later, the AB ratio (the sum of b, c, and d in formula (1)) of the Mg-rich/Ni-poor region is 1.71, and the ratio varies through 3.13 and 3.56 toward the inside of the alloy powder. This leads to the assumption that the Mg-rich/Ni-poor region is a phase similar to the 1-2 phase, and the phases inside the alloy powder vary through the ones similar to the 1-3, 2-7, and 5-19 phases toward the center. Similarly, in Example 52, the AB ratio varies through 3.16, 3.17, 3.36, and 3.90 from the Mg-rich/Ni-poor region into the inside of the alloy powder. This leads to the assumption that the Mg-rich/Ni-poor region is of a phase similar to the 1-3 phase, and the phases inside the alloy powder vary through the ones similar to the 1-3, 2-7, 5-19, and 1-5 phases toward the center. That is, it is seen that the measured AB ratios are not integer values, and vary from about 2 to about 5 from the Mg-rich/Ni-poor region toward the inside of the alloy powder. In this specification, the crystal structures from the 1-2 to 5-19 phases having different AB ratios are specifically mentioned. Recent reports have shown crystal structures having an AB ratio between the 5-19 and 1-5 phases. These are the crystal structures wherein the atoms at the B-site of the 1-5 phase unit cell are substituted with the atoms of the A-site at a certain cycle. The present invention does not exclude such crystal structures.

It is usually preferred that the Mg/Ni-containing region includes at least two regions having compositions with different Mg molar ratios.

The at least two regions of the Mg/Ni-containing region include regions (a) and (b), wherein region (a) is of a composition with a Mg molar ratio not less than 0 times and not more than 0.50 times the Mg molar ratio in formula (1), and region (b) is of a composition with a Mg molar ratio more than 0.50 times and not more than 0.95 times the Mg molar ratio in formula (1). Such at least two Mg/Ni-containing regions may be present inside the alloy powder in any distribution.

It is preferred that the Mg-rich/Ni-poor region and the at least two Mg/Ni-containing regions indicate concentration gradients of decreasing Mg molar ratio and increasing Ni molar ratio from the outermost surface toward the center of the alloy powder. It is assumed that, with a structure having such concentration gradients, the crystal structures are increasingly B-site rich from the outermost surface toward the center of the alloy powder to smoothen the hydrogen migration, and act to relieve the strain generated upon expansion/contraction of the alloy due to hydrogen absorption/desorption.

When the hydrogen storage alloy powder of the present invention contains Al, and has a composition with an Al molar ratio higher than that in formula (1), the Al molar ratio is preferably not less than 1.05 times and not more than 2.00 times the Al molar ratio in formula (1).

When the hydrogen storage alloy powder of the present invention contains Al, and has at least two Mg/Ni-containing regions, it is preferred that the at least two regions include regions (a') and (b'), wherein region (a') is of a composition with an Al molar ratio not less than 1.20 times and not more than 2.00 times the Al molar ratio in formula (1), and region (b') is of a composition with an Al molar ratio not less than 0.50 times and not more than 1.00 time of the Al molar ratio in formula (1). It is more preferred for inhibition of alloy powder decrepitation that region (a') is present in insular manner, surrounded by region (b'). Here, region (a) and region (a') or region (b) and region (b') as the Mg/Ni-containing region may be the same or different.

The hydrogen storage alloy powder of the present invention has a mean volume diameter (MV) of preferably 20 to 100 μm, more preferably 40 to 80 μm. When this alloy powder, together with an electrically conductive material, a binder, and the like, is used for producing an anode for a nickel-hydrogen rechargeable battery, the alloy powder may be packed at a high density.

The hydrogen storage alloy powder according to the present invention may be prepared, for example, by the following method.

First, alloy powder having the composition of the objective hydrogen storage alloy powder except for at least Mg is prepared. This alloy powder may be prepared by any process without limitation, and may be by a conventional process, such as strip casting with a single roll, twin rolls, or a disk, or metal mold casting.

When strip casting is employed, starting materials are provided having a particular alloy composition excluding Mg. Then, in an inert gas atmosphere, the starting materials are heated to melt into an alloy melt, and the alloy melt is poured onto a water-cooled copper roll and rapidly cooled and solidified into alloy flakes. On the other hand, when metal mold casting is employed, the alloy melt obtained by the above process is poured into a water-cooled copper mold and rapidly cooled and solidified into an ingot. The cooling rate is different between strip casting and metal mold casting, and for obtaining an alloy having uniform compositional distribution with little segregation, strip casting is preferred. Further, for preparing an alloy having uniform compositional distribution with little segregation, the alloy without Mg thus obtained may be subjected to heat treatment.

Next, the cast alloy is pulverized into alloy powder. The pulverization may be carried out in a conventional pulverizer. In order for the alloy powder without Mg to undergo smooth diffusion and reaction of Mg in the subsequent heat treatment step to be discussed later, the particle size in MV of the alloy powder is preferably 20 to 1000 μm, more preferably 20 to 400 μm, most preferably 20 to 100 μm.

Separately from the production of this alloy powder, powder of Mg metal or a Mg-containing alloy is prepared. The powder of Mg metal may be prepared by pulverizing bare Mg metal in a conventional pulverizer. The powder of a Mg-containing alloy may be prepared in the same way as the alloy powder without Mg. For preventing evaporation of Mg in the subsequent heat treatment step to be discussed later, the melting point of the Mg-containing alloy is preferably as low as possible and not higher than the boiling point of Mg metal. Elements to be combined with Mg metal may be, for example, at least one element selected from Al, Cu, Zn, Ga, Sn, and In. Particularly preferred are Mg—Al, Mg—In, and Mg—Zn alloys having the alloy melting point lower than the melting point of Mg metal. R to be combined with Mg metal may be La, Ce, Pr, Nd, Sm, and Mm (misch metal) containing these, Eu, Yb, or the like. In order for the alloy powder without Mg to undergo smooth diffusion and reaction of Mg in the subsequent heat treatment step to be discussed later, the particle size of the powder of Mg metal or the Mg-containing alloy in mean particle diameter (D50) is preferably 20 to 2000 μm, more preferably 20 to 1500 μm.

Next, the alloy powder without Mg and the powder of Mg metal or the Mg-containing alloy are blended so as to give a composition of a desired hydrogen storage alloy powder, and mixed. It is preferred to make as homogenous mixture as possible for efficient diffusion and reaction of Mg in the subsequent heat treatment step to be discussed later. The mixing may be carried out in a conventional mixer, such as a rotary mixer of a double-cone or V-type, or a stirring mixer having vanes or screws. A pulverizer such as a ball mill or an attritor mill may also be used to pulverize and mix the alloy powder without Mg and the powder of Mg metal or the Mg-containing alloy.

The diffusion and reaction of Mg is usually carried out at a relatively low temperature, i.e., 400 to 1090° C., so that an amount of the components such as Mg will not evaporate. Strictly, however, taking the yield of each component into account, the alloy powder without Mg and the powder of Mg metal or the Mg-containing alloy are mixed so as to obtain an alloy of the desired composition.

The mixture thus obtained is subjected to heat treatment preferably at 400 to 1090° C. for 0.5 to 240 hours. This heat treatment may be carried out in a conventional heat-treatment furnace in which the atmosphere may be controlled. The heat treatment may be carried out with the mixture being mixed, for example, in a rotary mixer such as a rotary kiln. During the heat treatment, Mg in the powder of Mg metal or the Mg-containing alloy is diffused into and reacted inside the alloy powder without Mg, resulting in hydrogen storage alloy powder of the present invention. The heat treatment is preferably carried out at such temperature and for such duration that the evaporation of Mg is suppressed and the diffusion and reaction easily proceed. Specifically, the temperature of the heat treatment is preferably at 500 to 1080° C., and the duration of the heat treatment is preferably 1 to 24 hours. Since Mg is prone to oxidation, the heat treatment is preferably carried out in vacuo or in an inert gas atmosphere, more preferably in an inert gas atmosphere under pressure. In this case, not only oxidation but also evaporation of Mg may be prevented.

The heat treatment may be carried out in two or more steps in the temperature range of 400 to 1090° C., for example, by holding the mixture in a temperature region slightly above the melting point of the powder of Mg metal or the Mg-containing alloy, raising the temperature, and holding the mixture in a higher temperature region. In this way, the diffusion and reaction may be effected more uniformly. Specifically, the mixture may be held at 660 to 750° C. for 0.1 to 2.0 hours, and then at 900 to 1080° C. for 4 to 24 hours.

In case part of the alloy powder after the heat treatment is aggregated, or has a powder particle size larger than the size suitable for an anode material for a nickel-hydrogen rechargeable battery, the hydrogen storage alloy powder obtained by the heat treatment may be subjected to loosening or pulverization. Generally, the particle size in MV after the loosening or pulverization is preferably 20 to 100 μm, more preferably 40 to 80 μm. The loosening or the pulverization may be carried out in a conventional pulverizer such as a feather mill, hammer mill, ball mill, or attritor mill.

The anode for a nickel-hydrogen rechargeable battery according to the present invention contains the hydrogen storage alloy powder of the present invention thus prepared. The hydrogen storage alloy powder of the present invention may be subjected to a conventional treatment, such as surface coating, for example, by plating or with a high polymer, or surface treatment with, for example, an acid or alkaline solution, prior to use depending on the desired characteristics.

The content of the hydrogen storage alloy powder in the anode for a nickel-hydrogen rechargeable battery of the present invention is preferably not less than 80 mass %, more preferably not less than 95 mass %, of the total amount of the materials constituting the anode, such as an electrically conductive material and a binder, exclusive of the collector.

The electrically conductive material may be a conventional one and may be, for example, carbon black such as acetylene black and furnace black, a carbonaceous material such as graphite, copper, nickel, or cobalt.

The binder may be a conventional one and may be, for example, carboxymethyl cellulose, polyvinyl alcohol, polyvinylbutyral, polyvinylpyrrolidone, polyethylene oxide, polytetrafluoroethylene (PTFE), ethylene-tetrafluoride-propylene hexafluoride copolymer (FEP).

The collector may be made of, for example, punched metal or foam metal. An anode for a nickel-hydrogen rechargeable battery is generally prepared by a so-called paste method, thus a punched metal is used. Such a paste-type anode may be prepared by mixing the hydrogen storage alloy powder of the present invention, the binder mentioned above, and optionally an electrically conductive material, an antioxidant, a surfactant, a thickener and/or the like, with water as a solvent into a paste, applying the paste to a collector, packing, drying, roller-pressing, and the like steps.

The anode for a nickel-hydrogen rechargeable battery of the present invention may have a water-repellent layer or an electrically conductive layer formed on its surface as desired. Such a layer may be formed by a conventional method. For example, the former may be formed by application of a fluorores in dispersion or the like followed by drying, whereas the latter by plating or the like.

The nickel-hydrogen rechargeable battery according to the present invention has the anode for a nickel-hydrogen rechargeable battery of the present invention. The remaining structures may be conventional.

The nickel-hydrogen rechargeable battery of the present invention may be in a variety of shapes, including a cylinder, a laminate, or a coin. In any shape, a nickel-hydrogen rechargeable battery is fabricated by placing a series of electrodes prepared by laminating an anode, a separator, and a cathode, in a stainless can or the like. In case of a cylindrical shape, the can generally acts as an anode terminal, so that the anode is connected to the anode terminal by rolling the series of electrodes into a roll with the anode outside, and inserting the roll in the can. The cathode is generally connected to a cathode terminal with a lead wire.

The separator may be made of, for example, a non-woven fabric of polymer fibers such as of nylon, polypropylene, or polyethylene, or a porous polymer film such as of polyethylene or polypropylene.

The cathode usually contains a nickel oxide and may be, for example, a non-sintered nickel electrode. A non-sintered nickel electrode is prepared by mixing nickel hydroxide, a binder, and optionally cobalt hydroxide, cobalt monoxide, and/or cobalt metal, with water as a solvent into a paste, applying the paste to a collector of, for example, foam metal, packing, drying, roller-pressing, and the like steps.

In the container in which the series of electrodes has been placed, a 6 to 8 N potassium hydroxide solution as an alkaline electrolyte is introduced. An alkaline electrolyte containing lithium hydroxide or sodium hydroxide may also be used. The container is usually equipped with a gasket for sealing the battery, and a safety valve which operates upon pressure buildup in the battery.

EXAMPLES

The present invention will now be explained in detail with reference to Examples and Comparative Examples, which do not intend to limit the present invention.

Example 1

Starting materials of the composition of the hydrogen storage alloy powder as shown in Table 1 other than Mg were measured out, and melted in a high-frequency melting furnace in an argon gas atmosphere into an alloy melt. The alloy melt, at a pouring temperature of 1400° C., was rapidly cooled and solidified by strip casting in a single roll casting system having a water-cooled copper roll, into flakes having an average thickness of 0.4 mm. The obtained flakes were pulverized in a ball mill into alloy powder having an MV of 85 μm. The composition of the obtained alloy was analyzed with ICP, and found to be $La_{0.66}Sm_{0.13}Zr_{0.01}Ni_{3.42}Al_{0.20}$.

The alloy powder thus obtained was thoroughly mixed with Mg metal powder having a mean particle diameter (D50) of 110 μm in a mortar. The obtained mixture was held in an argon gas atmosphere at 700° C. for 30 minutes, and then at an elevated temperature of 970° C. for 12 hours. The composition of the obtained alloy powder was analyzed with ICP and found to be $La_{0.66}Sm_{0.13}Zr_{0.01}Mg_{0.20}Ni_{3.42}Al_{0.20}$. The heat treated alloy powder was loosened in a mortar to obtain hydrogen storage alloy powder having an MV of 70 μm.

Figure 2:
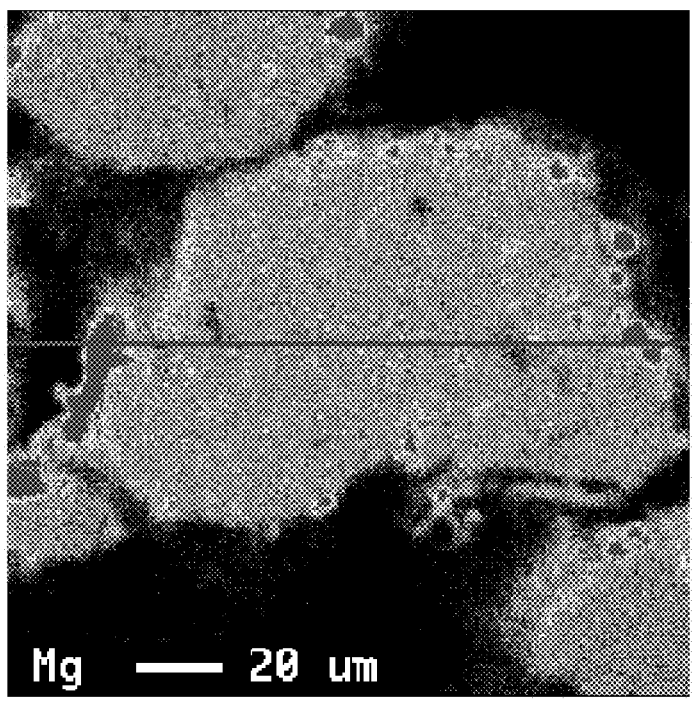
FIG. 2 is a photocopy of a Mg mapping image of the sectional structure of the hydrogen storage alloy powder prepared in Example 1.
Figure 3:
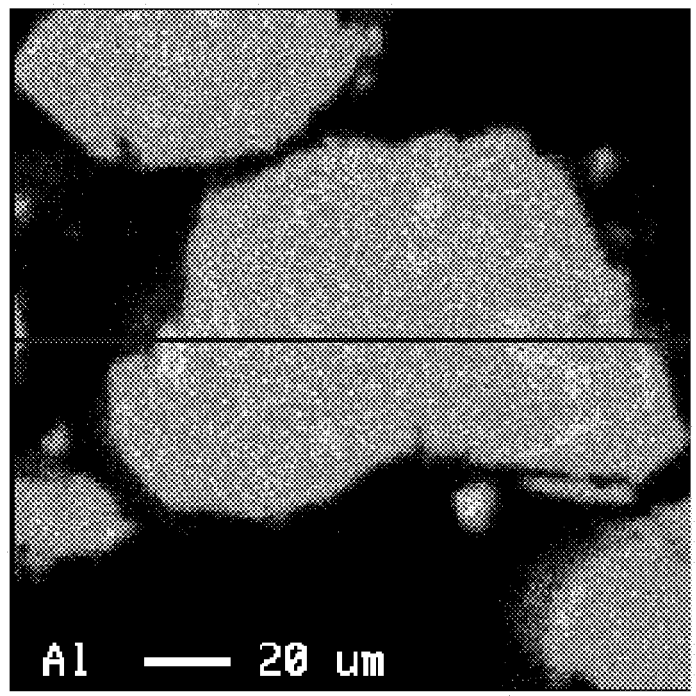
FIG. 3 is a photocopy of an Al mapping image of the sectional structure of the hydrogen storage alloy powder prepared in Example 1.
Figure 4:
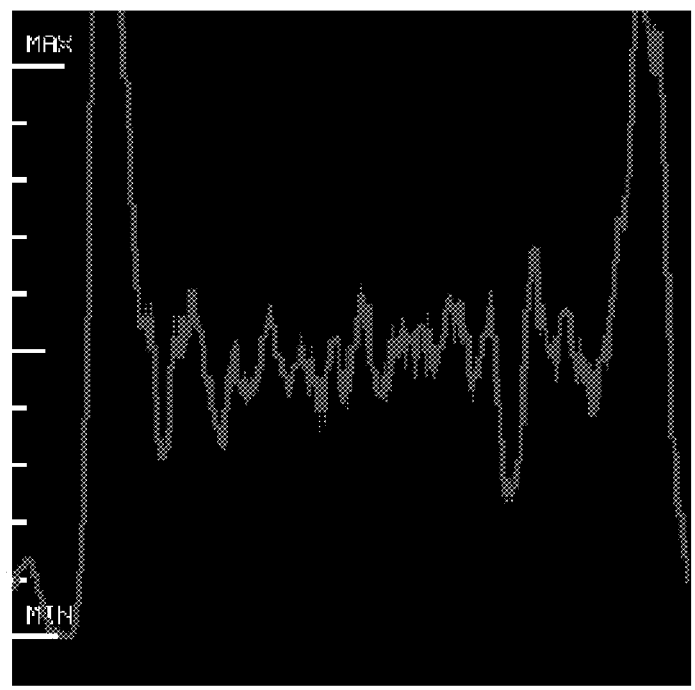
FIG. 4 shows a result of a Mg line analysis of the sectional structure of the hydrogen storage alloy powder prepared in Example 1.
Figure 5:
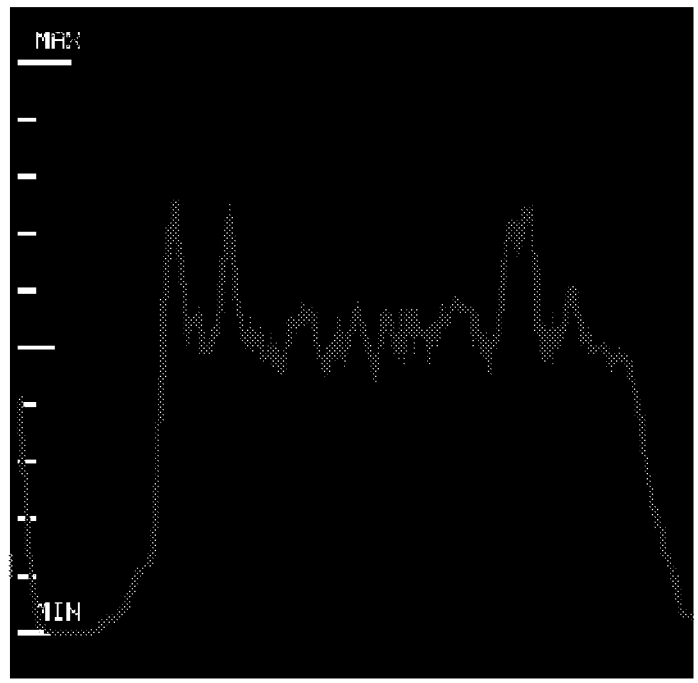
FIG. 5 shows a result of an Al line analysis of the sectional structure of the hydrogen storage alloy powder prepared in Example 1.

A sectional surface of the heat-treated hydrogen storage alloy powder was observed in EPMA (manufactured by JEOL LTD., trade name JXA8800) at a magnification of 500×. A photocopy of a Comp image is shown in FIG. 1, a photocopy of an elemental mapping image of Mg is shown in FIG. 2, a photocopy of an elemental mapping image of Al is shown in FIG. 3, a result of Mg line analysis determined along the line shown in FIG. 2 is shown in FIG. 4, and a result of Al line analysis determined along the line shown in FIG. 3 is shown in FIG. 5.

Further, the sectional surface of the same hydrogen storage alloy powder was observed in FE-EPMA (manufactured by JEOL LTD., trade name JXA8500F) at a magnification of 350×, and an elemental mapping image of Mg was obtained. The contrast and level of the Mg elemental mapping image were adjusted for apparent observation of the contrasting densities of Mg. Regions with a higher Mg concentration compared to the inside the alloy powder were observed at the outermost surface of the alloy powder. In a Mg-poor region deeper inside than that region, regions with still poorer Mg compared to the surrounding regions were observed in insular manner. The regions with richer Mg compared to the inside and located at the outermost surface of the alloy powder, the insular regions with poorer Mg compared to the surrounding regions and located deeper inside the alloy powder than the above region, and the remaining regions inside the alloy powder were quantitatively analyzed under the conditions described above. It was determined that the composition of the regions with richer Mg compared to the inside and located at the outermost surface was $La_{0.63}Sm_{0.12}Zr_{0.01}Mg_{0.24}Ni_{2.96}Al_{0.23}$, the composition of the insular regions with poorer Mg was $La_{0.75}Sm_{0.15}Zr_{0.01}Mg_{0.09}Ni_{3.60}Al_{0.34}$, and the compositions of the remaining regions inside the alloy powder were $La_{0.68}Sm_{0.13}Zr_{0.01}Mg_{0.18}Ni_{3.11}Al_{0.17}$ and $La_{0.70}Sm_{0.14}Zr_{0.01}Mg_{0.15}Ni_{3.32}Al_{0.18}$. Thus, it was confirmed that the regions with richer Mg compared to the inside and located at the outermost surface were the Mg-rich/Ni-poor regions, and the other regions were the Mg/Ni-containing regions. It was further confirmed that the insular regions with poorer Mg has a composition with an Al molar ratio not less than 1.20 times and not more than 2.00 times the Al molar ratio (0.20) of the overall composition of the alloy powder $La_{0.66}Sm_{0.13}Zr_{0.01}Mg_{0.20}Ni_{3.42}Al_{0.20}$, and surrounded by the regions having a composition with an Al molar ratio not less than 0.50 times and not more than 1.00 time (the said remaining regions, $La_{0.68}Sm_{0.13}Zr_{0.01}Mg_{0.18}Ni_{3.11}Al_{0.17}$, $La_{0.70}Sm_{0.44}Zr_{0.01}Mg_{0.15}Ni_{3.32}Al_{0.18}$). The results are shown in Table 1. The Mg, Ni, and Al molar ratios of the Mg-rich/Ni-poor regions with respect to the Mg, Ni, and Al molar rations in formula (1), respectively, and the Mg, Ni, and Al molar ratios of the Mg/Ni-containing regions with respect to the Mg, Ni, and Al molar rations in formula (1), respectively, calculated from the above results, are shown in Table 4.

The thickness and long axis diameter of the Mg-rich/Ni-poor regions, and the proportion of the Mg-rich/Ni-poor regions in the circumferential length of the alloy powder were determined to be 6 μm, 30 μm, and 18%, respectively. These results are shown in Table 7.

[Characteristics Evaluation Test]

The battery characteristics of the hydrogen storage alloy powder thus obtained were determined in the following manner. The results of the evaluation of the battery characteristics are shown in Table 7.

<Discharge Capacity>

0.15 g of the hydrogen storage alloy powder and 0.45 g of carbonyl nickel powder were thoroughly mixed in a mortar, and the resulting mixture was pressed at 2000 kgf/cm$^2$ into a pellet of 10 mm diameter. The pellet was held between two sheets of nickel mesh, and the periphery of the mesh sheets was spot-welded to press-contact the mesh sheets. Further, a nickel lead wire was spot-welded to the mesh sheets, to thereby prepare an anode. The obtained anode and a sintered nickel electrode as a counter electrode were immersed in a 8N aqueous KOH solution, and subjected to charge/discharge cycle test at 25° C.

The charge/discharge was effected using a charge/discharge device (manufactured by KEISOKUKI CENTER CO., LTD., trade name BS2500-05R1) by repeating 100 times the cycle of charging at a current of 150 mA per 1 g of the hydrogen storage alloy for 170 minutes, taking a break for 10 minutes, and discharging to a mercury oxide electrode at a current of 150 mA per 1 g of the hydrogen storage alloy to −0.7 V.

<Cycle Characteristics>

The cycle characteristics were defined as follows, based on the maximum discharge capacity and the discharge capacity at the 100th cycle determined in the charge/discharge discussed above.

Cycle characteristics=(discharge capacity at 100th cycle/maximum discharge capacity)×100

Examples 2 to 36 and 41 to 43

Figure 6:
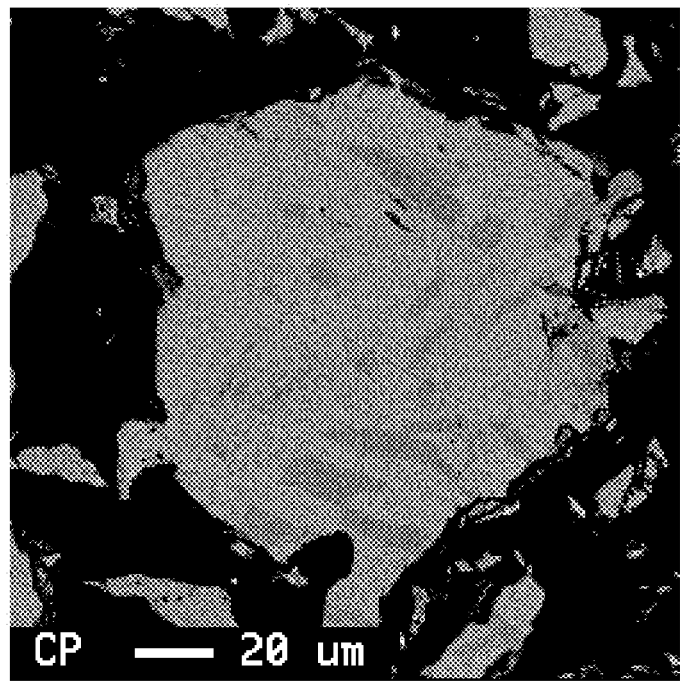
FIG. 6 is a photocopy of a Comp image of a sectional structure of the hydrogen storage alloy powder prepared in Example 2.
Figure 7:
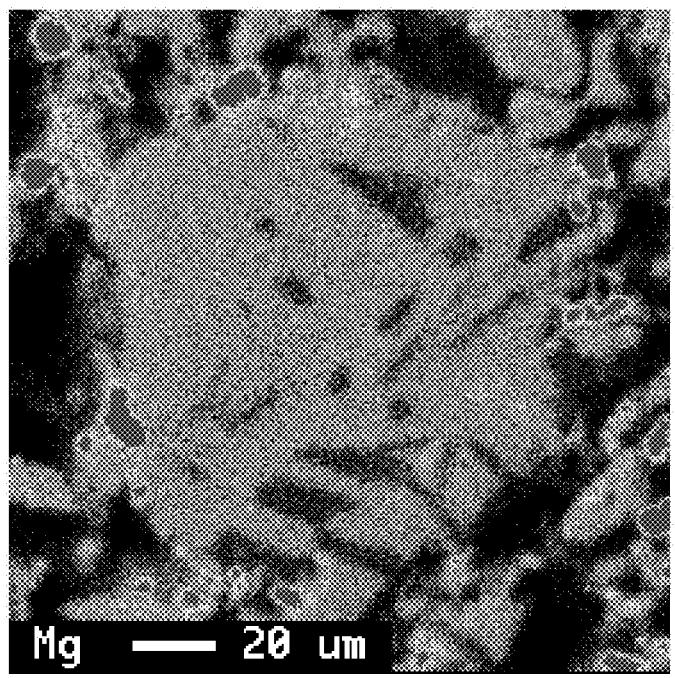
FIG. 7 is a photocopy of a Mg mapping image of the sectional structure of the hydrogen storage alloy powder prepared in Example 2.
Figure 8:
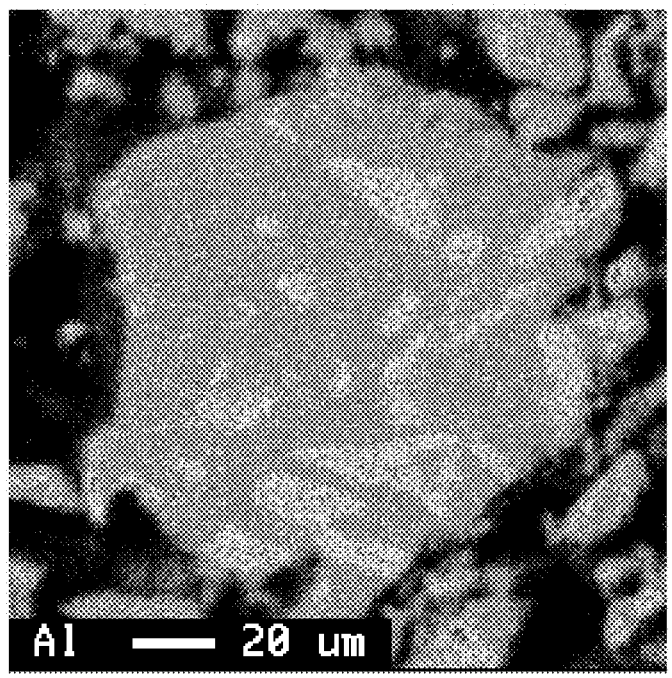
FIG. 8 is a photocopy of an Al mapping image of the sectional structure of the hydrogen storage alloy powder prepared in Example 2.

Hydrogen storage alloy powder was prepared in the same way as in Example 1 except that the composition of the starting materials was changed to obtain hydrogen storage alloy powder of the composition shown in Tables 1 to 3. A sectional surface of the hydrogen storage alloy powder prepared in Example 2 is shown in FIG. 6 as a photocopy of a Comp image taken in EPMA, a photocopy of the Mg elemental mapping image of the powder is shown in FIG. 7, and a photocopy of the Al elemental mapping image of the powder is shown in FIG. 8.

Further, the sectional surface of the same hydrogen storage alloy powder was observed in FE-EPMA in the same way as in Example 1, and the results are shown in Tables 1 to 3. In Tables 1 to 3, in the column headed the composition of the Mg/Ni-containing regions, when the Mg/Ni-containing regions included at least region (a') having a composition with an Al molar ratio not less than 1.20 times and not more than 2.00 times the Al molar ratio of formula (1) representing the overall composition of the alloy powder, and region (b') having a composition with an Al molar ratio not less than 0.50 times and not more than 1.00 time the Al molar ratio of formula (1), with region (a') being present in insular manner, surrounded by region (b'), the compositional formula was marked with "Al rich". No compositional formula marked with "Al rich" in the column of the composition of the Mg/Ni-containing regions, means that the insular regions were not observed in the Mg mapping image. The compositional formulae not marked with "Al rich" are set out in the order of the region closer to the alloy powder surface toward the region closer to the center of the powder, inside of the Mg-rich/Ni-poor regions.

Figure 14:
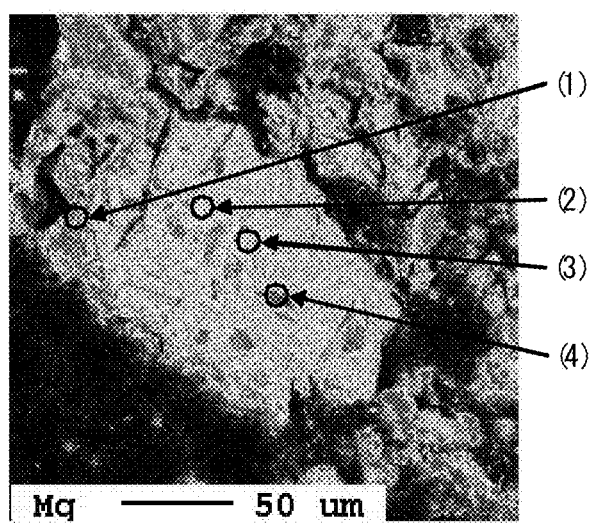
FIG. 14 is a photocopy of a Mg mapping image of the sectional structure of the hydrogen storage alloy powder prepared in Example 22.

A photocopy of the Mg elemental mapping image obtained by observation in FE-EPMA of a sectional surface of the hydrogen storage alloy powder prepared in Example 22 is shown in FIG. 14. The areas indicated with arrows (1) to (4) in FIG. 14 were quantitatively analyzed for each constitutive element. It was determined that area (1) was the Mg-rich/Ni-poor region, and areas (2) to (4) were the Mg/Ni-containing regions. Area (4) was the Mg/Ni-containing region having a composition with an Al molar ratio not less than 1.20 times and not more than 2.00 times the Al molar ratio (0.15) of the overall composition $(La_{0.45}Gd_{0.10}Pr_{0.06}Nd_{0.19}Mg_{0.20}Ni_{3.30}Al_{0.15})$ of the hydrogen storage alloy powder prepared in Example 22, present in insular manner, and surrounded by the regions having a composition with an Al molar ratio not less than 0.50 times and not more than 1.00 time (areas (2) and (3)).

The Mg, Ni, and Al molar ratios of the Mg-rich/Ni-poor regions with respect to the Mg, Ni, and Al molar ratios in formula (1), respectively, and the Mg, Ni, and Al molar ratios of the Mg/Ni-containing regions with respect to the Mg, Ni, and Al molar rations in formula (1), respectively, determined and calculated in the same way as in Example 1, are shown in Tables 4 to 6.

The thickness and long axis diameter of the Mg-rich/Ni-poor regions, and the proportion of the Mg-rich/Ni-poor regions in the circumferential length of the alloy powder determined in the same way as in Example 1, and the battery characteristics are shown in Tables 7 to 9.

Examples 37 to 40

Hydrogen storage alloy powder was prepared in the same way as in Example 1 except that the composition of the starting materials was changed, and the casting of the starting materials without Mg was carried out using a copper mold to obtain an ingot of 20 mm thick, to thereby obtain a hydrogen storage alloy powder of the composition shown in Table 3. The results of observation in FE-EPMA of a sectional surface of the hydrogen storage alloy powder in the same way as in Example 1 is shown in Table 3.

The Mg, Ni, and Al molar ratios of the Mg-rich/Ni-poor regions with respect to the Mg, Ni, and Al molar rations in formula (1), respectively, and the Mg, Ni, and Al molar ratios of the Mg/Ni-containing regions with respect to the Mg, Ni, and Al molar rations in formula (1), respectively, determined and calculated in the same way as in Example 1, are shown in Table 6.

The thickness and long axis diameter of the Mg-rich/Ni-poor regions, and the proportion of the Mg-rich/Ni-poor regions in the circumferential length of the alloy powder determined in the same way as in Example 1, and the battery characteristics are shown in Table 9.

Examples 44 to 52

Hydrogen storage alloy powder was prepared in the same way as in Example 1 except that the composition of the starting materials was changed, and the duration of the heat treatment originally carried out at 970° C. for 12 hours was changed to 3 hours (Examples 44, 47, and 50) 6 hours (Examples 45, 48, and 51), and 9 hours (Examples 46, 49, and 52), to thereby obtain a hydrogen storage alloy powder of the composition shown in Table 3. The results of observation in FE-EPMA of a sectional surface of the hydrogen storage alloy powder in the same way as in Example 1 is shown in Table 3.

Figure 15:
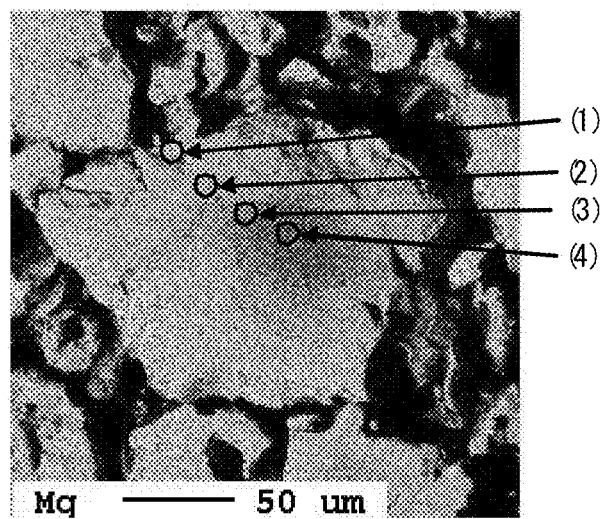
FIG. 15 is a photocopy of a Mg mapping image of the sectional structure of the hydrogen storage alloy powder prepared in Example 44.

A photocopy of the Mg mapping image obtained by observation in FE-EPMA of a sectional surface of the hydrogen storage alloy powder prepared in Example 44 is shown in FIG. 15. In this alloy powder, no Mg/Ni-containing region was observed inside the alloy powder, which is poorer in Mg compared to the surrounding regions and present in insular manner. The areas indicated with arrows (1) to (4) in FIG. 15 were quantitatively analyzed for each constitutive element. It was determined that area (1) was the Mg-rich/Ni-poor region, and areas (2) to (4) were the Mg/Ni-containing regions.

The Mg, Ni, and Al molar ratios of the Mg-rich/Ni-poor regions with respect to the Mg, Ni, and Al molar rations in formula (1), respectively, and the Mg, Ni, and Al molar ratios of the Mg/Ni-containing regions with respect to the Mg, Ni, and Al molar rations in formula (1), respectively, determined and calculated in the same way as in Example 1, are shown in Table 6.

The thickness and long axis diameter of the Mg-rich/Ni-poor regions, and the proportion of the Mg-rich/Ni-poor regions in the circumferential length of the alloy powder determined in the same way as in Example 1, and the battery characteristics are shown in Table 9.

Comparative Example 1

Figure 9:
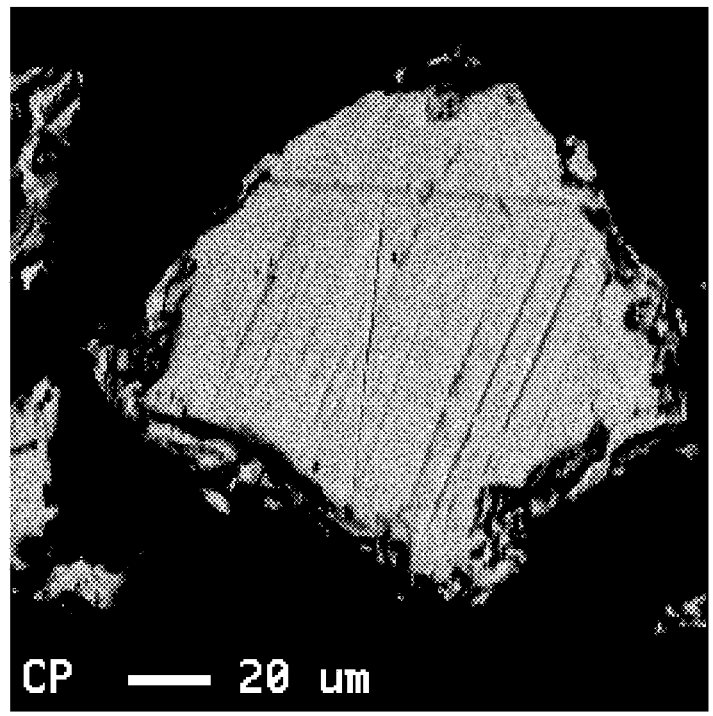
FIG. 9 is a photocopy of a Comp image of a sectional structure of the hydrogen storage alloy powder prepared in Comparative Example 1.
Figure 10:
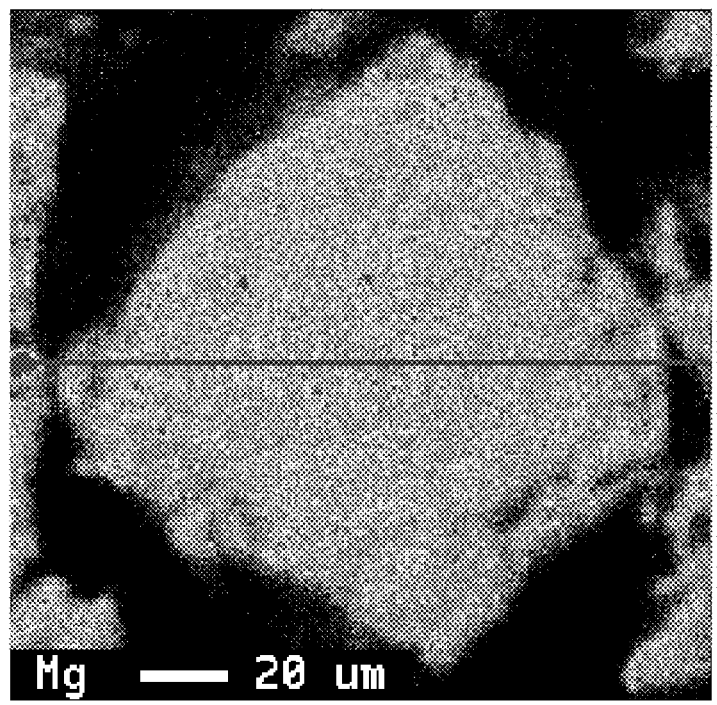
FIG. 10 is a photocopy of a Mg mapping image of the sectional structure of the hydrogen storage alloy powder prepared in Comparative Example 1.
Figure 11:
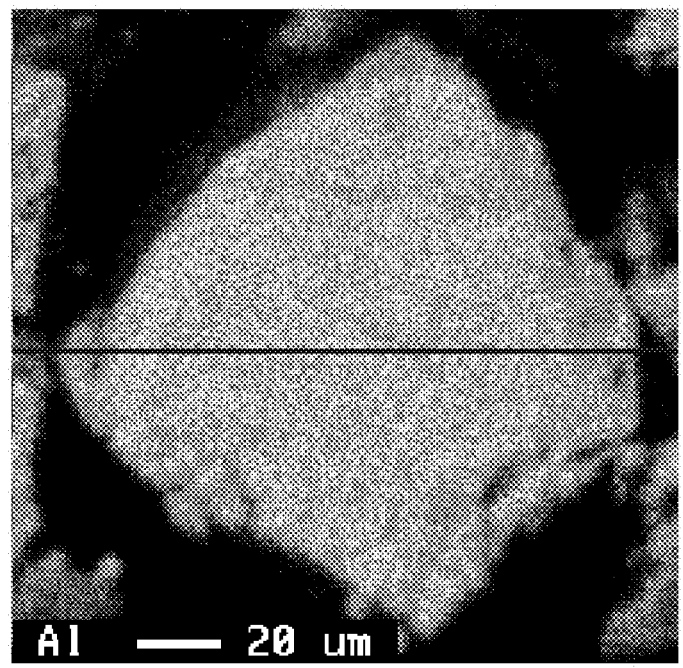
FIG. 11 is a photocopy of an Al mapping image of the sectional structure of the hydrogen storage alloy powder prepared in Comparative Example 1.
Figure 12:
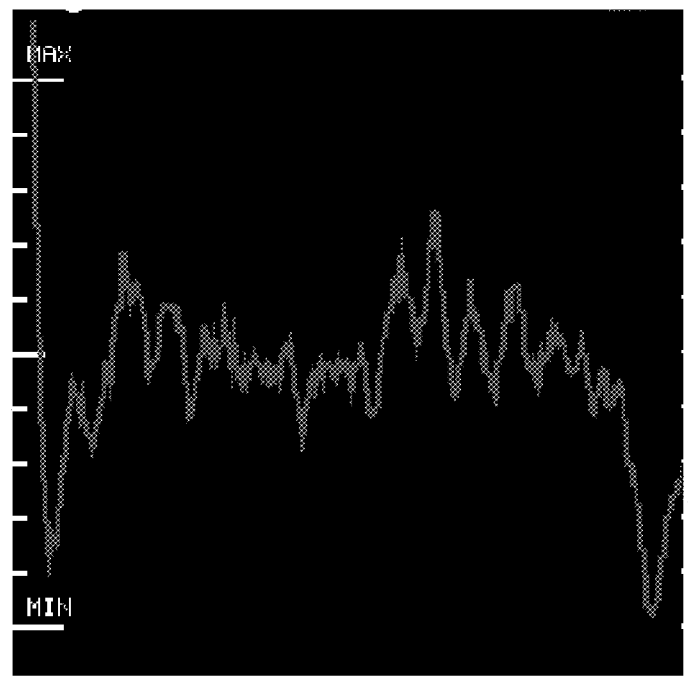
FIG. 12 shows a result of a Mg line analysis of the sectional structure of the hydrogen storage alloy powder prepared in Comparative Example 1.
Figure 13:
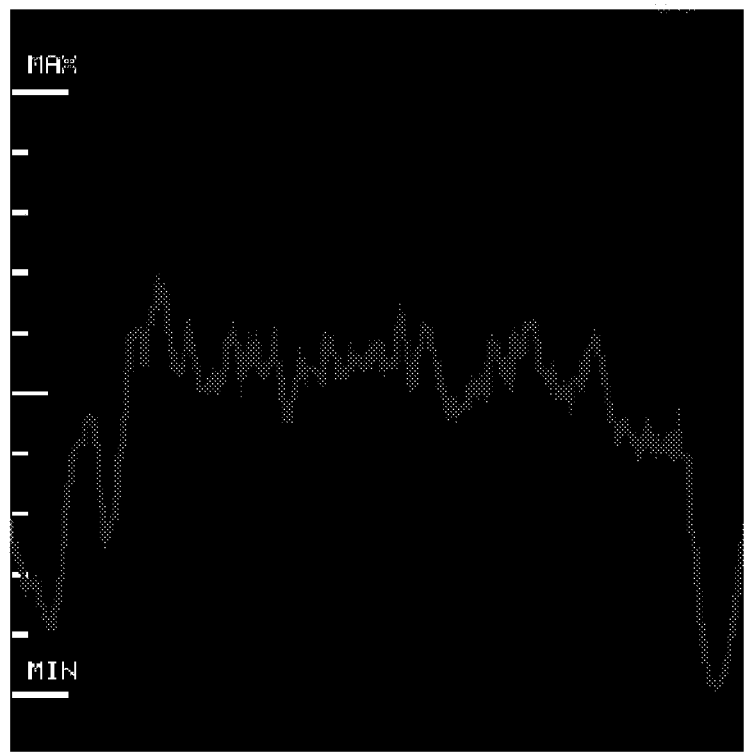
FIG. 13 shows a result of an Al line analysis of the sectional structure of the hydrogen storage alloy powder prepared in Comparative Example 1.

In order to obtain an alloy of the same composition as the hydrogen storage alloy powder of Example 1, all the starting materials including Mg metal were simultaneously mixed, and subjected to strip casting in the same way as in Example 1 to obtain flakes. The flakes thus obtained were heat treated in an argon gas atmosphere at 950° C. for 6 hours. The heat-treated flakes were pulverized in a ball mill, to obtain hydrogen storage alloy powder having an MV of 70 µm. The composition of the obtained alloy powder was analyzed with ICP and found to be $La_{0.66}Sm_{0.13}Zr_{0.01}Mg_{0.20}Ni_{3.42}Al_{0.20}$. A photocopy of a Comp image of the obtained hydrogen storage alloy powder taken in EPMA is shown in FIG. 9, a photocopy of the Mg elemental mapping is shown in FIG. 10, a photocopy of the Al elemental mapping is shown in FIG. 11, a result of Mg line analysis determined along the line shown in FIG. 10 is shown in FIG. 12, and a result of Al line analysis determined along the line shown in FIG. 11 is shown in FIG. 13.

As a result of observation of a sectional surface of the hydrogen storage alloy powder in FE-EPMA in the same way as in Example 1, no Mg-rich/Ni-poor region was observed at the outermost surface of the alloy powder. Quantitative analysis of two regions inside the alloy powder revealed that the region closer to the surface had a composition $La_{0.65}Sm_{0.12}Zr_{0.01}Mg_{0.20}Ni_{3.40}Al_{0.21}$, and the region closer to the center had a composition $La_{0.66}Sm_{0.12}Zr_{0.01}Mg_{0.20}Ni_{3.43}Al_{0.20}$. The battery characteristics were determined in the same way as in Example 1. The results are shown in Table 9.

Comparative Example 2

Hydrogen storage alloy powder was prepared in the same way as in Comparative Example 1 except that the composition of the starting materials was changed to obtain a hydrogen storage alloy powder of the composition shown in Table 3. As a result of observation of a sectional surface of the hydrogen storage alloy powder in FE-EPMA in the same way as in Example 1, no Mg-rich/Ni-poor region was observed at the outermost surface of the alloy powder. Quantitative analysis of two regions inside the alloy powder in the same way as in Comparative Example 1 revealed that the region closer to the surface had a composition $La_{0.15}Pr_{0.47}Nd_{0.24}Mg_{0.15}Ni_{3.31}Co_{0.14}Al_{0.08}$, and the region closer to the center had a composition $La_{0.16}Pr_{0.46}Nd_{0.25}Mg_{0.15}Ni_{3.30}Co_{0.16}Al_{0.07}$. The battery characteristics were determined in the same way as in Example 1. The results are shown in Table 9.

Comparative Example 3

Hydrogen storage alloy powder was prepared in the same way as in Comparative Example 1 except that the composition of the starting materials was changed, and a copper mold was used in the casting to obtain an ingot of 20 mm thick, to thereby obtain a hydrogen storage alloy powder of the composition shown in Table 3. As a result of observation of a sectional surface of the hydrogen storage alloy powder in FE-EPMA in the same way as in Example 1, no Mg-rich/Ni-poor region was observed at the outermost surface of the alloy powder. Quantitative analysis of two regions inside the alloy powder in the same way as in Comparative Example 1 revealed that the region closer to the surface had a composition $La_{0.62}Sm_{0.14}Zr_{0.01}Mg_{0.13}Ni_{3.44}Al_{0.10}$, and the region closer to the center had a composition $La_{0.69}Sm_{0.14}Zr_{0.01}Mg_{0.17}Ni_{3.37}Al_{0.15}$. The battery characteristics were determined in the same way as in Example 1. The results are shown in Table 9.

TABLE 1

| | Alloy composition of hydrogen storage alloy powder | Composition of Mg-rich/Ni-poor region | Composition of Mg/Ni-containing region |
|---|---|---|---|
| Example 1 | $La_{0.66}Sm_{0.13}Zr_{0.01}Mg_{0.20}Ni_{3.42}Al_{0.20}$ | $La_{0.63}Sm_{0.12}Zr_{0.01}Mg_{0.24}Ni_{2.96}Al_{0.23}$ | $La_{0.68}Sm_{0.13}Zr_{0.01}Mg_{0.18}Ni_{3.11}Al_{0.17}$ |
| | | | $La_{0.70}Sm_{0.14}Zr_{0.01}Mg_{0.15}Ni_{3.32}Al_{0.18}$ |
| Example 2 | $La_{0.59}Sm_{0.20}Zr_{0.01}Mg_{0.20}Ni_{3.42}Al_{0.15}$ | $La_{0.55}Sm_{0.19}Zr_{0.01}Mg_{0.25}Ni_{3.21}Al_{0.17}$ | $La_{0.75}Sm_{0.15}Zr_{0.01}Mg_{0.09}Ni_{3.69}Al_{0.34}(Al\ rich)$ |
| | | | $La_{0.62}Sm_{0.20}Zr_{0.01}Mg_{0.19}Ni_{3.23}Al_{0.14}$ |
| | | | $La_{0.62}Sm_{0.21}Zr_{0.01}Mg_{0.16}Ni_{3.33}Al_{0.14}$ |
| Example 3 | $La_{0.57}Ce_{0.05}Sm_{0.14}Zr_{0.01}Mg_{0.23}Ni_{3.65}Al_{0.10}$ | $La_{0.50}Sm_{0.12}Ce_{0.04}Zr_{0.01}Mg_{0.23}Ni_{2.88}Al_{0.12}$ | $La_{0.66}Sm_{0.23}Zr_{0.01}Mg_{0.08}Ni_{3.49}Al_{0.21}(Al\ rich)$ |
| | | | $La_{0.68}Sm_{0.15}Ce_{0.05}Zr_{0.01}Mg_{0.19}Ni_{3.11}Al_{0.09}$ |
| | | | $La_{0.67}Sm_{0.16}Ce_{0.06}Zr_{0.01}Mg_{0.10}Ni_{3.58}Al_{0.17}(Al\ rich)$ |
| Example 4 | $La_{0.60}Sm_{0.27}Mg_{0.14}Ni_{1.80}Al_{0.13}$ | $La_{0.59}Sm_{0.27}Mg_{0.14}Ni_{1.80}Al_{0.13}$ | $La_{0.62}Sm_{0.28}Mg_{0.10}Ni_{3.45}Al_{0.12}$ |
| Example 5 | $La_{0.20}Nd_{0.40}Sm_{0.30}Mg_{0.10}Ni_{3.48}Al_{0.18}$ | $La_{0.19}Sm_{0.28}Nd_{0.37}Mg_{0.16}Ni_{3.20}Al_{0.22}$ | $La_{0.65}Sm_{0.29}Mg_{0.06}Ni_{3.89}Al_{0.20}(Al\ rich)$ |
| | | | $La_{0.26}Sm_{0.31}Nd_{0.44}Mg_{0.08}Ni_{3.38}Al_{0.16}$ |
| Example 6 | $La_{0.32}Nd_{0.29}Sm_{0.26}Mg_{0.13}Ni_{3.50}Al_{0.18}$ | $La_{0.29}Sm_{0.24}Nd_{0.27}Mg_{0.20}Ni_{3.21}Al_{0.21}$ | $La_{0.21}Sm_{0.32}Nd_{0.43}Mg_{0.04}Ni_{3.66}Al_{0.34}(Al\ rich)$ |
| | | | $La_{0.33}Sm_{0.28}Nd_{0.27}Mg_{0.10}Ni_{3.35}Al_{0.17}$ |
| Example 7 | $Nd_{0.87}Mg_{0.13}Ni_{3.31}Al_{0.18}$ | $Nd_{0.85}Mg_{0.15}Ni_{1.63}Al_{0.18}$ | $La_{0.35}Sm_{0.28}Nd_{0.32}Mg_{0.05}Ni_{3.75}Al_{0.29}(Al\ rich)$ |
| | | | $Nd_{0.89}Mg_{0.11}Ni_{2.99}Al_{0.15}$ |
| | | | $Nd_{0.93}Mg_{0.07}Ni_{3.46}Al_{0.37}(Al\ rich)$ |
| Example 8 | $Pr_{0.22}Nd_{0.65}Mg_{0.13}Ni_{3.31}Al_{0.20}$ | $Pr_{0.20}Nd_{0.60}Mg_{0.20}Ni_{2.96}Al_{0.21}$ | $Pr_{0.23}Nd_{0.66}Mg_{0.11}Ni_{3.14}Al_{0.16}$ |
| | | | $Pr_{0.24}Nd_{0.72}Mg_{0.04}Ni_{3.66}Al_{0.29}(Al\ rich)$ |
| Example 9 | $La_{0.78}Zr_{0.02}Mg_{0.20}Ni_{3.52}Al_{0.20}$ | $La_{0.73}Zr_{0.02}Mg_{0.25}Ni_{3.24}Al_{0.23}$ | $La_{0.80}Zr_{0.02}Mg_{0.18}Ni_{3.39}Al_{0.18}$ |
| | | | $La_{0.83}Zr_{0.02}Mg_{0.15}Ni_{3.49}Al_{0.19}$ |
| | | | $La_{0.87}Zr_{0.02}Mg_{0.08}Ni_{3.69}Al_{0.35}(Al\ rich)$ |
| Example 10 | $La_{0.82}Mg_{0.18}Ni_{3.55}Al_{0.20}$ | $La_{0.81}Mg_{0.19}Ni_{3.18}Al_{0.24}$ | $La_{0.83}Mg_{0.17}Ni_{3.37}Al_{0.16}$ |
| | | | $La_{0.88}Mg_{0.12}Ni_{3.44}Al_{0.17}$ |
| Example 11 | $La_{0.80}Mg_{0.20}Ni_{3.60}Al_{0.20}$ | $La_{0.73}Mg_{0.27}Ni_{3.23}Al_{0.26}$ | $La_{0.95}Mg_{0.05}Ni_{3.57}Al_{0.32}(Al\ rich)$ |
| | | | $La_{0.82}Mg_{0.18}Ni_{3.45}Al_{0.13}$ |
| | | | $La_{0.85}Mg_{0.15}Ni_{3.62}Al_{0.15}$ |
| Example 12 | $La_{0.80}Mg_{0.20}Ni_{3.55}Al_{0.17}$ | $La_{0.74}Mg_{0.26}Ni_{2.35}Al_{0.23}$ | $La_{0.91}Mg_{0.09}Ni_{3.76}Al_{0.28}(Al\ rich)$ |
| | | | $La_{0.85}Mg_{0.18}Ni_{3.27}Al_{0.16}$ |
| | | | $La_{0.85}Mg_{0.15}Ni_{3.46}Al_{0.16}$ |
| Example 13 | $La_{0.83}Mg_{0.17}Ni_{3.55}Co_{0.05}Al_{0.15}$ | $La_{0.74}Mg_{0.26}Ni_{3.10}Co_{0.04}Al_{0.16}$ | $La_{0.97}Mg_{0.03}Ni_{3.78}Al_{0.33}(Al\ rich)$ |
| | | | $La_{0.84}Mg_{0.16}Ni_{3.26}Co_{0.05}Al_{0.14}$ |
| Example 14 | $La_{0.15}Pr_{0.45}Nd_{0.25}Mg_{0.15}Ni_{3.30}Co_{0.15}Al_{0.08}$ | $La_{0.14}Pr_{0.40}Nd_{0.22}Mg_{0.22}Ni_{2.76}Co_{0.13}Al_{0.08}$ | $La_{0.94}Mg_{0.06}Ni_{3.68}Co_{0.05}Al_{0.27}(Al\ rich)$ |
| | | | $La_{0.15}Pr_{0.46}Nd_{0.25}Mg_{0.14}Ni_{2.97}Co_{0.14}Al_{0.07}$ |
| | | | $La_{0.15}Pr_{0.46}Nd_{0.25}Mg_{0.14}Ni_{2.85}Co_{0.14}Al_{0.08}$ |
| | | | $La_{0.16}Pr_{0.49}Nd_{0.27}Mg_{0.08}Ni_{3.3}Co_{0.15}Al_{0.12}(Al\ rich)$ |
| Example 15 | $La_{0.18}Pr_{0.42}Nd_{0.27}Mg_{0.13}Ni_{3.38}Mn_{0.06}Co_{0.05}Al_{0.08}$ | $La_{0.17}Pr_{0.38}Nd_{0.25}Mg_{0.20}Ni_{2.61}Mn_{0.05}Co_{0.04}Al_{0.07}$ | $La_{0.19}Pr_{0.43}Nd_{0.28}Mg_{0.10}Ni_{2.86}Mn_{0.05}Co_{0.04}Al_{0.06}$ |
| | | | $La_{0.18}Pr_{0.43}Nd_{0.27}Mn_{0.12}Ni_{2.71}Mn_{0.05}Co_{0.04}Al_{0.08}$ |
| | | | $La_{0.20}Pr_{0.48}Nd_{0.31}Mg_{0.01}Mn_{0.07}Co_{0.05}Al_{0.09}$ |
| Example 16 | $La_{0.15}Y_{0.05}Pr_{0.32}Nd_{0.32}Mg_{0.16}Ni_{3.21}Al_{0.17}$ | $La_{0.15}Y_{0.05}Pr_{0.30}Nd_{0.30}Mg_{0.20}Ni_{1.58}Al_{0.18}$ | $La_{0.15}Y_{0.05}Pr_{0.32}Nd_{0.33}Mg_{0.15}Ni_{2.98}Al_{0.16}$ |
| | | | $La_{0.16}Y_{0.05}Pr_{0.35}Nd_{0.35}Mg_{0.09}Ni_{3.34}Al_{0.20}(Al\ rich)$ |
| Example 17 | $La_{0.55}Pr_{0.06}Nd_{0.19}Mg_{0.20}Ni_{3.20}Cu_{0.10}Al_{0.10}$ | $La_{0.16}Pr_{0.05}Nd_{0.16}Mg_{0.33}Ni_{2.94}Cu_{0.09}Al_{0.15}$ | $La_{0.57}Pr_{0.06}Nd_{0.20}Mg_{0.17}Ni_{2.94}Cu_{0.09}Al_{0.08}$ |
| | | | $La_{0.61}Pr_{0.07}Nd_{0.21}Mg_{0.11}Ni_{3.29}Cu_{0.10}Al_{0.17}(Al\ rich)$ |
| Example 18 | $La_{0.55}Pr_{0.06}Nd_{0.19}Mg_{0.20}Ni_{3.27}Fe_{0.05}Al_{0.08}$ | $La_{0.50}Pr_{0.06}Nd_{0.18}Mg_{0.26}Ni_{1.61}Fe_{0.02}Al_{0.08}$ | $La_{0.58}Pr_{0.06}Nd_{0.20}Mg_{0.16}Ni_{3.02}Fe_{0.05}Al_{0.06}$ |
| | | | $La_{0.66}Pr_{0.06}Nd_{0.23}Mg_{0.05}Ni_{3.12}Fe_{0.05}Al_{0.09}$ |

TABLE 2

| | Alloy composition of hydrogen storage alloy powder | Composition of Mg-rich/Ni-poor region | Composition of Mg/Ni-containing region |
|---|---|---|---|
| Example 19 | $La_{0.55}Pr_{0.06}Nd_{0.19}Mg_{0.20}Ni_{3.27}Sn_{0.05}Al_{0.08}$ | $La_{0.47}Pr_{0.05}Nd_{0.16}Mg_{0.32}Ni_{2.88}Sn_{0.04}Al_{0.16}$ | $La_{0.59}Pr_{0.06}Nd_{0.20}Mg_{0.15}Ni_{3.14}Sn_{0.05}Al_{0.06}$ |
| Example 20 | $La_{0.53}Pr_{0.06}Nd_{0.19}Mg_{0.22}Ni_{3.27}Si_{0.03}Al_{0.10}$ | $La_{0.44}Pr_{0.05}Nd_{0.16}Mg_{0.35}Ni_{2.88}Si_{0.03}Al_{0.13}$ | $La_{0.65}Pr_{0.07}Nd_{0.23}Mg_{0.05}Ni_{3.29}Si_{0.05}Al_{0.09}$ |
| Example 21 | $La_{0.51}Pr_{0.08}Nd_{0.21}Mg_{0.20}Ni_{3.30}Nb_{0.02}Al_{0.10}$ | $La_{0.47}Pr_{0.08}Nd_{0.20}Mg_{0.25}Ni_{2.89}Nb_{0.02}Al_{0.18}$ | $La_{0.55}Pr_{0.06}Nd_{0.19}Mg_{0.20}Ni_{3.11}Si_{0.03}Al_{0.08}$ |
| Example 22 | $La_{0.45}Gd_{0.10}Pr_{0.06}Nd_{0.06}Mg_{0.20}Ni_{3.30}Al_{0.15}$ | $La_{0.43}Gd_{0.10}Pr_{0.06}Nd_{0.06}Mg_{0.23}Ni_{2.96}Al_{0.19}$ | $La_{0.61}Pr_{0.07}Nd_{0.22}Mg_{0.10}Ni_{3.36}Si_{0.03}Al_{0.16}$ (Al rich) |
| | | | $La_{0.52}Pr_{0.09}Nd_{0.22}Mg_{0.18}Ni_{3.05}Nb_{0.02}Al_{0.07}$ |
| | | | $La_{0.59}Pr_{0.07}Nd_{0.24}Mg_{0.08}Ni_{3.41}Nb_{0.02}Al_{0.15}$ (Al rich) |
| | | | $La_{0.47}Gd_{0.10}Pr_{0.06}Nd_{0.06}Mg_{0.19}Ni_{3.18}Al_{0.12}$ |
| | | | $La_{0.49}Gd_{0.11}Pr_{0.06}Nd_{0.07}Mg_{0.14}Ni_{3.28}Al_{0.14}$ |
| Example 23 | $La_{0.56}Pr_{0.07}Nd_{0.20}Mg_{0.17}Ni_{3.35}Al_{0.10}$ | $La_{0.55}Pr_{0.07}Nd_{0.20}Mg_{0.18}Ni_{1.65}Al_{0.11}$ | $La_{0.52}Gd_{0.12}Pr_{0.07}Nd_{0.07}Mg_{0.22}Ni_{3.45}Al_{0.25}$ (Al rich) |
| | | | $La_{0.58}Pr_{0.07}Nd_{0.20}Mg_{0.15}Ni_{3.24}Al_{0.09}$ |
| Example 24 | $La_{0.51}Pr_{0.08}Nd_{0.21}Mg_{0.20}Ni_{3.30}Al_{0.15}$ | $La_{0.50}Pr_{0.08}Nd_{0.21}Mg_{0.21}Ni_{3.02}Al_{0.16}$ | $La_{0.63}Pr_{0.08}Nd_{0.22}Mg_{0.07}Ni_{3.56}Al_{0.18}$ (Al rich) |
| | | | $La_{0.51}Pr_{0.08}Nd_{0.22}Mg_{0.19}Ni_{3.11}Al_{0.13}$ |
| Example 25 | $La_{0.55}Pr_{0.06}Nd_{0.19}Mg_{0.20}Ni_{3.30}Al_{0.20}$ | $La_{0.53}Pr_{0.06}Nd_{0.18}Mg_{0.23}Ni_{2.87}Al_{0.25}$ | $La_{0.58}Pr_{0.09}Nd_{0.25}Mg_{0.08}Ni_{3.51}Al_{0.26}$ (Al rich) |
| | | | $La_{0.57}Pr_{0.06}Nd_{0.20}Mg_{0.17}Ni_{2.99}Al_{0.19}$ |
| Example 26 | $La_{0.50}Pr_{0.06}Nd_{0.19}Mg_{0.25}Ni_{3.30}Al_{0.10}$ | $La_{0.38}Pr_{0.05}Nd_{0.15}Mg_{0.42}Ni_{2.61}Al_{0.14}$ | $La_{0.59}Pr_{0.07}Nd_{0.22}Mg_{0.08}Ni_{3.26}Al_{0.19}$ |
| | | | $La_{0.63}Pr_{0.07}Nd_{0.20}Mg_{0.15}Ni_{3.44}Al_{0.32}$ (Al rich) |
| Example 27 | $La_{0.60}Pr_{0.25}Mg_{0.15}Ni_{3.45}Al_{0.16}$ | $La_{0.52}Pr_{0.22}Mg_{0.26}Ni_{3.20}Al_{0.20}$ | $La_{0.53}Pr_{0.06}Nd_{0.20}Mg_{0.21}Ni_{2.80}Al_{0.09}$ |
| | | | $La_{0.60}Pr_{0.07}Nd_{0.23}Mg_{0.10}Ni_{3.45}Al_{0.13}$ (Al rich) |
| Example 28 | $La_{0.70}Pr_{0.15}Mg_{0.15}Ni_{3.49}Al_{0.16}$ | $La_{0.68}Pr_{0.15}Mg_{0.17}Ni_{1.70}Al_{0.16}$ | $La_{0.66}Pr_{0.27}Mg_{0.07}Ni_{3.86}Al_{0.30}$ (Al rich) |
| | | | $La_{0.61}Pr_{0.26}Mg_{0.13}Ni_{3.35}Al_{0.14}$ |
| Example 29 | $La_{0.62}Pr_{0.25}Mg_{0.13}Ni_{3.45}Al_{0.16}$ | $La_{0.55}Pr_{0.22}Mg_{0.23}Ni_{3.11}Al_{0.19}$ | $La_{0.76}Pr_{0.15}Mg_{0.08}Ni_{3.51}Al_{0.26}$ (Al rich) |
| | | | $La_{0.71}Pr_{0.15}Mg_{0.14}Ni_{3.25}Al_{0.14}$ |
| Example 30 | $La_{0.61}Pr_{0.22}Mg_{0.17}Ni_{3.45}Al_{0.16}$ | $La_{0.58}Pr_{0.21}Mg_{0.21}Ni_{1.65}Al_{0.16}$ | $La_{0.63}Pr_{0.26}Mg_{0.09}Ni_{3.61}Al_{0.26}$ (Al rich) |
| | | | $La_{0.62}Pr_{0.25}Mg_{0.12}Ni_{3.29}Al_{0.15}$ |
| Example 31 | $La_{0.73}Pr_{0.12}Mg_{0.15}Ni_{3.59}Al_{0.16}$ | $La_{0.66}Pr_{0.11}Mg_{0.23}Ni_{3.21}Al_{0.18}$ | $La_{0.66}Pr_{0.24}Mg_{0.10}Ni_{3.49}Al_{0.26}$ (Al rich) |
| | | | $La_{0.62}Pr_{0.22}Mg_{0.16}Ni_{3.18}Al_{0.15}$ |
| | | | $La_{0.74}Pr_{0.12}Mg_{0.14}Ni_{3.30}Al_{0.14}$ |
| Example 32 | $La_{0.55}Pr_{0.20}Sm_{0.10}Mg_{0.15}Ni_{3.45}Al_{0.16}$ | $La_{0.53}Sm_{0.10}Pr_{0.20}Mg_{0.17}Ni_{1.67}Al_{0.17}$ | $La_{0.80}Pr_{0.13}Mg_{0.07}Ni_{3.71}Al_{0.28}$ (Al rich) |
| | | | $La_{0.56}Sm_{0.11}Pr_{0.22}Mg_{0.07}Ni_{3.50}Al_{0.26}$ (Al rich) |
| | | | $La_{0.60}Sm_{0.11}Pr_{0.22}Mg_{0.14}Ni_{3.31}Al_{0.13}$ |
| Example 33 | $La_{0.58}Pr_{0.06}Nd_{0.14}Mg_{0.22}Ni_{3.30}Al_{0.20}$ | $La_{0.49}Pr_{0.05}Nd_{0.12}Mg_{0.34}Ni_{2.99}Al_{0.21}$ | $La_{0.60}Pr_{0.06}Nd_{0.14}Mg_{0.20}Ni_{3.20}Al_{0.17}$ |
| | | | $La_{0.65}Pr_{0.07}Nd_{0.16}Mg_{0.12}Ni_{3.51}Al_{0.32}$ (Al rich) |
| Example 34 | $La_{0.56}Pr_{0.20}Mg_{0.24}Ni_{3.45}Al_{0.16}$ | $La_{0.46}Pr_{0.16}Mg_{0.38}Ni_{3.14}Al_{0.20}$ | $La_{0.59}Pr_{0.21}Mg_{0.20}Ni_{3.24}Al_{0.15}$ |
| | | | $La_{0.66}Pr_{0.24}Mg_{0.10}Ni_{3.47}Al_{0.30}$ (Al rich) |
| Example 35 | $La_{0.60}Pr_{0.12}Y_{0.12}Mg_{0.05}Mg_{0.23}Ni_{3.45}Al_{0.16}$ | $La_{0.56}Pr_{0.11}Y_{0.05}Mg_{0.28}Ni_{1.65}Al_{0.15}$ | $La_{0.61}Pr_{0.12}Y_{0.05}Mg_{0.22}Ni_{3.34}Al_{0.14}$ |
| | | | $La_{0.70}Pr_{0.14}Y_{0.06}Mg_{0.10}Ni_{3.55}Al_{0.34}$ (Al rich) |
| Example 36 | $La_{0.65}Pr_{0.10}Mg_{0.25}Ni_{3.59}Al_{0.16}$ | $La_{0.52}Pr_{0.08}Mg_{0.40}Ni_{3.27}Al_{0.22}$ | $La_{0.68}Pr_{0.11}Mg_{0.21}Ni_{3.34}Al_{0.15}$ |
| | | | $La_{0.77}Pr_{0.12}Mg_{0.11}Ni_{3.65}Al_{0.25}$ (Al rich) |

TABLE 3

| | Alloy composition of hydrogen storage alloy powder | Composition of Mg-rich/Ni-poor region | Composition of Mg/Nr containing region |
|---|---|---|---|
| Example 37 | $La_{0.67}Sm_{0.16}Zr_{0.01}Mg_{0.16}Ni_{3.42}Al_{0.13}$ | $La_{0.65}Sm_{0.15}Zr_{0.01}Mg_{0.19}Ni_{3.08}Al_{0.16}$ | $La_{0.68}Sm_{0.16}Zr_{0.01}Mg_{0.15}Ni_{3.19}Al_{0.11}$ |
| Example 38 | $La_{0.45}Sm_{0.47}Mg_{0.08}Ni_{3.55}Al_{0.07}$ | $La_{0.42}Sm_{0.43}Mg_{0.15}Ni_{1.67}Al_{0.06}$ | $La_{0.74}Sm_{0.18}Zr_{0.01}Mg_{0.07}Ni_{3.45}Al_{0.18}$(Al rich) |
| | | | $La_{0.46}Sm_{0.48}Mg_{0.06}Ni_{3.40}Al_{0.05}$ |
| | | | $La_{0.47}Sm_{0.46}Mg_{0.10}Ni_{3.32}Al_{0.06}$ |
| Example 39 | $La_{0.32}Pr_{0.37}Nd_{0.17}Mg_{0.14}Ni_{3.32}Al_{0.08}$ | $La_{0.29}Pr_{0.33}Nd_{0.15}Mg_{0.23}Ni_{1.52}Al_{0.07}$ | $La_{0.33}Pr_{0.38}Nd_{0.17}Mg_{0.12}Ni_{2.97}Al_{0.07}$ |
| | | | $La_{0.32}Pr_{0.38}Nd_{0.17}Mg_{0.13}Ni_{3.15}Al_{0.07}$ |
| | | | $La_{0.35}Pr_{0.40}Nd_{0.19}Mg_{0.08}Ni_{3.39}Al_{0.21}$ |
| Example 40 | $La_{0.55}Pr_{0.06}Nd_{0.19}Mg_{0.20}Ni_{3.30}Al_{0.10}$ | $La_{0.49}Pr_{0.05}Nd_{0.17}Mg_{0.29}Ni_{2.87}Al_{0.17}$ | $La_{0.56}Pr_{0.06}Nd_{0.19}Mg_{0.19}Ni_{3.00}Al_{0.09}$ |
| | | | $La_{0.62}Pr_{0.07}Nd_{0.22}Mg_{0.09}Ni_{3.55}Al_{0.17}$(Al rich) |
| Example 41 | $Pr_{0.45}Nd_{0.45}Sm_{0.08}Mg_{0.02}Ni_{3.40}Al_{0.07}$ | $Pr_{0.45}Nd_{0.44}Sm_{0.08}Mg_{0.03}Ni_{3.01}Al_{0.09}$ | $Pr_{0.45}Nd_{0.46}Sm_{0.08}Mg_{0.01}Ni_{3.31}Al_{0.06}$ |
| | | | $Pr_{0.46}Nd_{0.46}Sm_{0.08}Ni_{3.38}Al_{0.07}$ |
| | | | $Pr_{0.45}Nd_{0.47}Sm_{0.08}Ni_{3.41}Al_{0.07}$ |
| Example 42 | $La_{0.78}Pr_{0.10}Mg_{0.12}Ni_{3.40}Al_{0.25}$ | $La_{0.73}Pr_{0.09}Mg_{0.18}Ni_{3.10}Al_{0.44}$ | $La_{0.80}Pr_{0.10}Mg_{0.10}Ni_{3.21}Al_{0.22}$ |
| | | | $La_{0.83}Pr_{0.11}Mg_{0.06}Ni_{3.31}Al_{0.22}$ |
| | | | $La_{0.86}Pr_{0.11}Mg_{0.03}Ni_{3.51}Al_{0.26}$ |
| Example 43 | $La_{0.60}Sm_{0.19}Ca_{0.01}Mg_{0.20}Ni_{3.30}Co_{0.10}Mn_{0.10}Sn_{0.10}Al_{0.05}$ | $La_{0.53}Sm_{0.17}Ca_{0.01}Mg_{0.29}Ni_{2.91}Co_{0.09}Mn_{0.09}Sn_{0.09}Al_{0.07}$ | $La_{0.63}Sm_{0.20}Ca_{0.01}Mg_{0.16}Ni_{2.95}Co_{0.09}Mn_{0.09}Sn_{0.09}Al_{0.04}$ |
| | | | $La_{0.68}Sm_{0.21}Ca_{0.01}Mg_{0.10}Ni_{3.19}Co_{0.10}Mn_{0.10}Sn_{0.10}Al_{0.04}$ |
| | | | $La_{0.73}Sm_{0.22}Ca_{0.01}Mg_{0.04}Ni_{3.42}Co_{0.10}Mn_{0.10}Sn_{0.10}Al_{0.05}$ |
| Example 44 | $La_{0.25}Nd_{0.25}Sm_{0.40}Mg_{0.10}Ni_{3.35}Al_{0.10}$ | $La_{0.22}Nd_{0.22}Sm_{0.42}Mg_{0.14}Ni_{2.64}Al_{0.13}$ | $La_{0.24}Nd_{0.24}Sm_{0.46}Mg_{0.06}Ni_{3.19}Al_{0.09}$ |
| | | | $La_{0.24}Nd_{0.24}Sm_{0.48}Mg_{0.04}Ni_{3.29}Al_{0.09}$ |
| | | | $La_{0.25}Nd_{0.25}Sm_{0.49}Mg_{0.01}Ni_{3.45}Al_{0.12}$ |
| Example 45 | $La_{0.25}Nd_{0.25}Sm_{0.40}Mg_{0.10}Ni_{3.35}Al_{0.10}$ | $La_{0.22}Nd_{0.22}Sm_{0.43}Mg_{0.13}Ni_{2.75}Al_{0.12}$ | $La_{0.23}Nd_{0.23}Sm_{0.47}Mg_{0.07}Ni_{2.97}Al_{0.09}$ |
| | | | $La_{0.24}Nd_{0.24}Sm_{0.48}Mg_{0.04}Ni_{3.10}Al_{0.09}$ |
| | | | $La_{0.24}Nd_{0.24}Sm_{0.49}Mg_{0.03}Ni_{3.41}Al_{0.11}$ |
| Example 46 | $La_{0.25}Nd_{0.25}Sm_{0.40}Mg_{0.10}Ni_{3.35}Al_{0.10}$ | $La_{0.22}Nd_{0.22}Sm_{0.44}Mg_{0.12}Ni_{2.84}Al_{0.11}$ | $La_{0.23}Nd_{0.23}Sm_{0.45}Mg_{0.09}Ni_{2.86}Al_{0.09}$ |
| | | | $La_{0.24}Nd_{0.24}Sm_{0.46}Mg_{0.06}Ni_{3.05}Al_{0.09}$ |
| | | | $La_{0.24}Nd_{0.24}Sm_{0.48}Mg_{0.04}Ni_{3.40}Al_{0.11}$ |
| Example 47 | $Nd_{0.85}Mg_{0.15}Ni_{3.10}Al_{0.10}$ | $Nd_{0.78}Mg_{0.22}Ni_{2.34}Al_{0.17}$ | $Nd_{0.87}Mg_{0.13}Ni_{2.56}Al_{0.07}$ |
| | | | $Nd_{0.91}Mg_{0.09}Ni_{2.78}Al_{0.09}$ |
| | | | $Nd_{0.97}Mg_{0.03}Ni_{3.42}Al_{0.12}$ |
| Example 48 | $Nd_{0.85}Mg_{0.15}Ni_{3.10}Al_{0.10}$ | $Nd_{0.80}Mg_{0.20}Ni_{2.45}Al_{0.18}$ | $Nd_{0.89}Mg_{0.11}Ni_{2.69}Al_{0.08}$ |
| | | | $Nd_{0.93}Mg_{0.07}Ni_{2.89}Al_{0.09}$ |
| | | | $Nd_{0.95}Mg_{0.05}Ni_{3.34}Al_{0.12}$ |
| Example 49 | $Nd_{0.85}Mg_{0.15}Ni_{3.10}Al_{0.10}$ | $Nd_{0.81}Mg_{0.19}Ni_{2.57}Al_{0.13}$ | $Nd_{0.91}Mg_{0.09}Ni_{2.74}Al_{0.07}$ |
| | | | $Nd_{0.93}Mg_{0.07}Ni_{2.97}Al_{0.09}$ |
| | | | $Nd_{0.96}Mg_{0.04}Ni_{3.25}Al_{0.12}$ |
| Example 50 | $La_{0.50}Nd_{0.45}Mg_{0.05}Ni_{3.65}Al_{0.10}$ | $La_{0.49}Nd_{0.44}Mg_{0.07}Ni_{3.32}Al_{0.15}$ | $La_{0.51}Nd_{0.45}Mg_{0.04}Ni_{3.41}Al_{0.08}$ |
| | | | $La_{0.52}Nd_{0.47}Mg_{0.01}Ni_{3.54}Al_{0.09}$ |
| | | | $La_{0.53}Nd_{0.47}Ni_{3.68}Al_{0.10}$ |
| Example 51 | $La_{0.50}Nd_{0.45}Mg_{0.05}Ni_{3.65}Al_{0.10}$ | $La_{0.49}Nd_{0.45}Mg_{0.06}Ni_{3.19}Al_{0.14}$ | $La_{0.51}Nd_{0.45}Mg_{0.04}Ni_{3.32}Al_{0.08}$ |
| | | | $La_{0.51}Nd_{0.46}Mg_{0.03}Ni_{3.41}Al_{0.08}$ |
| | | | $La_{0.52}Nd_{0.47}Mg_{0.01}Ni_{3.86}Al_{0.11}$ |
| Example 52 | $La_{0.50}Nd_{0.45}Mg_{0.05}Ni_{3.65}Al_{0.10}$ | $La_{0.49}Nd_{0.45}M_{0.06}Ni_{3.02}Al_{0.14}$ | $La_{0.51}Nd_{0.45}Mg_{0.04}Ni_{3.09}Al_{0.08}$ |
| | | | $La_{0.51}Nd_{0.46}Mg_{0.03}Ni_{3.27}Al_{0.09}$ |
| | | | $La_{0.52}Nd_{0.46}Mg_{0.02}Ni_{3.79}Al_{0.11}$ |
| Comp. Ex. 1 | $La_{0.66}Sm_{0.13}Zr_{0.01}Mg_{0.20}Ni_{3.42}Al_{0.20}$ | — | |

TABLE 3-continued

| | Alloy composition of hydrogen storage alloy powder | Composition of Mg-rich/Ni-poor region | Composition of Mg/Nr containing region |
|---|---|---|---|
| Comp. Ex 2 | $La_{0.15}Pr_{0.45}Nd_{0.25}Mg_{0.15}Ni_{3.30}Co_{0.15}Al_{0.08}$ | — | — |
| Comp. Ex. 3 | $La_{0.67}Sm_{0.16}Zr_{0.01}Mg_{0.16}Ni_{3.42}Al_{0.13}$ | — | — |

TABLE 4

| | Mg-rich/Ni-poor region | | | Mg/Ni-containing region 1 | | | Mg/Ni-containing region 2 | | | Mg/Ni-containing region 3 | | |
|---|---|---|---|---|---|---|---|---|---|---|---|---|
| | Mg/Mg in powder | Ni/Ni in powder | Al/Al in powder | Mg/Mg in powder | Ni/Ni in powder | Al/Al in powder | Mg/Mg in powder | Ni/Ni in powder | Al/Al in powder | Mg/Mg in powder | Ni/Ni in powder | Al/Al in powder |
| Example 1 | 1.20 | 0.87 | 1.14 | 0.90 | 0.91 | 0.85 | 0.75 | 0.97 | 0.90 | 0.44 | 1.05 | 1.68 |
| Example 2 | 1.25 | 0.94 | 1.13 | 0.95 | 0.94 | 0.93 | 0.80 | 0.97 | 0.93 | 0.40 | 1.02 | 1.40 |
| Example 3 | 1.43 | 0.84 | 1.20 | 0.83 | 0.91 | 0.90 | 0.43 | 1.05 | 1.70 | | | |
| Example 4 | 1.08 | 0.49 | 0.93 | 0.77 | 0.95 | 0.86 | 0.46 | 1.07 | 1.43 | | | |
| Example 5 | 1.60 | 0.92 | 1.22 | 0.80 | 0.97 | 0.89 | 0.40 | 1.05 | 1.89 | | | |
| Example 6 | 1.54 | 0.92 | 1.17 | 0.77 | 0.96 | 0.94 | 0.38 | 1.07 | 1.61 | | | |
| Example 7 | 1.15 | 0.49 | 1.00 | 0.85 | 0.90 | 0.83 | 0.54 | 1.05 | 2.06 | | | |
| Example 8 | 1.54 | 0.89 | 1.17 | 0.85 | 0.95 | 0.89 | 0.31 | 1.11 | 1.61 | | | |
| Example 9 | 1.25 | 0.92 | 1.20 | 0.90 | 0.96 | 0.90 | 0.75 | 0.99 | 0.95 | 0.40 | 1.05 | 1.75 |
| Example 10 | 1.06 | 0.90 | 1.20 | 0.94 | 0.95 | 0.80 | 0.67 | 0.97 | 0.85 | 0.28 | 1.01 | 1.60 |
| Example 11 | 1.35 | 0.90 | 1.30 | 0.90 | 0.96 | 0.65 | 0.75 | 1.01 | 0.75 | 0.45 | 1.04 | 1.40 |
| Example 12 | 1.30 | 0.66 | 1.35 | 0.90 | 0.92 | 0.94 | 0.75 | 0.97 | 0.94 | 0.15 | 1.06 | 1.94 |
| Example 13 | 1.53 | 0.87 | 1.07 | 0.94 | 0.92 | 0.93 | 0.35 | 1.04 | 1.80 | | | |
| Example 14 | 1.60 | 0.84 | 1.00 | 0.93 | 0.90 | 0.88 | 0.93 | 0.86 | 1.00 | 0.53 | 1.01 | 1.50 |
| Example 15 | 1.54 | 0.77 | 0.88 | 0.77 | 0.85 | 0.75 | 0.92 | 0.80 | 1.00 | 0.08 | 1.01 | 1.13 |
| Example 16 | 1.25 | 0.49 | 1.06 | 0.94 | 0.93 | 0.94 | 0.56 | 1.04 | 1.18 | | | |
| Example 17 | 1.65 | 0.91 | 1.50 | 0.85 | 0.92 | 0.80 | 0.55 | 1.03 | 1.70 | | | |
| Example 18 | 1.30 | 0.49 | 1.00 | 0.80 | 0.92 | 0.75 | 0.25 | 1.05 | 1.13 | | | |

TABLE 5

| | Mg-rich/Ni-poor region | | | Mg/Ni-containing region 1 | | | Mg/Ni-containing region 2 | | | Mg/Ni-containing region 3 | | |
|---|---|---|---|---|---|---|---|---|---|---|---|---|
| | Mg/Mg in powder | Ni/Ni in powder | Al/Al in powder | Mg/Mg in powder | Ni/Ni in powder | Al/Al in powder | Mg/Mg in powder | Ni/Ni in powder | Al/Al in powder | Mg/Mg in powder | Ni/Ni in powder | Al/Al in powder |
| Example 19 | 1.60 | 0.88 | 2.00 | 0.75 | 0.96 | 0.75 | 0.25 | 1.01 | 1.13 | | | |
| Example 20 | 1.59 | 0.88 | 1.30 | 0.91 | 0.95 | 0.80 | 0.45 | 1.03 | 1.60 | | | |
| Example 21 | 1.25 | 0.88 | 1.80 | 0.90 | 0.92 | 0.70 | 0.40 | 1.03 | 1.50 | | | |
| Example 22 | 1.15 | 0.90 | 1.27 | 0.90 | 0.93 | 0.80 | 0.70 | 0.99 | 0.93 | 0.35 | 1.05 | 1.67 |
| Example 23 | 1.06 | 0.49 | 1.10 | 0.88 | 0.97 | 0.90 | 0.41 | 1.04 | 1.80 | | | |
| Example 24 | 1.05 | 0.92 | 1.07 | 0.95 | 0.94 | 0.87 | 0.40 | 1.06 | 1.73 | | | |
| Example 25 | 1.15 | 0.87 | 1.25 | 0.85 | 0.91 | 0.95 | 0.75 | 0.99 | 0.95 | 0.40 | 1.04 | 1.60 |
| Example 26 | 1.68 | 0.79 | 1.40 | 0.84 | 0.85 | 0.90 | 0.40 | 1.05 | 1.30 | | | |
| Example 27 | 1.73 | 0.93 | 1.25 | 0.87 | 0.97 | 0.88 | 0.47 | 1.12 | 1.88 | | | |
| Example 28 | 1.13 | 0.49 | 1.00 | 0.93 | 0.93 | 0.88 | 0.53 | 1.01 | 1.63 | | | |
| Example 29 | 1.77 | 0.90 | 1.19 | 0.92 | 0.95 | 0.94 | 0.69 | 1.05 | 1.63 | | | |
| Example 30 | 1.24 | 0.48 | 1.00 | 0.94 | 0.92 | 0.94 | 0.59 | 1.01 | 1.63 | | | |
| Example 31 | 1.53 | 0.89 | 1.13 | 0.93 | 0.92 | 0.88 | 0.47 | 1.03 | 1.75 | | | |
| Example 32 | 1.13 | 0.48 | 1.06 | 0.93 | 0.96 | 0.81 | 0.47 | 1.01 | 1.63 | | | |
| Example 33 | 1.55 | 0.91 | 1.05 | 0.91 | 0.97 | 0.85 | 0.55 | 1.06 | 1.60 | | | |
| Example 34 | 1.58 | 0.91 | 1.25 | 0.83 | 0.94 | 0.94 | 0.42 | 1.01 | 1.88 | | | |
| Example 35 | 1.22 | 0.48 | 0.94 | 0.96 | 0.97 | 0.88 | 0.43 | 1.03 | 2.13 | | | |
| Example 36 | 1.60 | 0.91 | 1.38 | 0.84 | 0.93 | 0.94 | 0.44 | 1.02 | 1.56 | | | |

TABLE 6

| | Mg-rich/Ni-poor region | | | Mg/Ni-containing region 1 | | | Mg/Ni-containing region 2 | | | Mg/Ni-containing region 3 | | |
|---|---|---|---|---|---|---|---|---|---|---|---|---|
| | Mg/Mg in powder | Ni/Ni in powder | Al/Al in powder | Mg/Mg in powder | Ni/Ni in powder | Al/Al in powder | Mg/Mg in powder | Ni/Ni in powder | Al/Al in powder | Mg/Mg in powder | Ni/Ni in powder | Al/Al in powder |
| Example 37 | 1.19 | 0.90 | 1.23 | 0.94 | 0.93 | 0.85 | 0.44 | 1.01 | 1.38 | | | |
| Example 38 | 1.88 | 0.47 | 0.86 | 0.75 | 0.96 | 0.71 | 1.25 | 0.94 | 0.86 | 0.63 | 1.04 | 1.71 |
| Example 39 | 1.64 | 0.46 | 0.88 | 0.86 | 0.89 | 0.88 | 0.93 | 0.95 | 0.88 | 0.57 | 1.02 | 2.63 |
| Example 40 | 1.45 | 0.87 | 1.70 | 0.95 | 0.91 | 0.90 | 0.45 | 1.08 | 1.70 | | | |
| Example 41 | 1.50 | 0.89 | 1.29 | 0.50 | 0.97 | 0.86 | 0.00 | 0.99 | 1.00 | 0.00 | 1.00 | 1.00 |
| Example 42 | 1.50 | 0.91 | 1.76 | 0.83 | 0.94 | 0.88 | 0.50 | 0.97 | 0.88 | 0.25 | 1.03 | 1.12 |
| Example 43 | 1.45 | 0.88 | 1.40 | 0.80 | 0.89 | 0.80 | 0.50 | 0.97 | 0.80 | 0.20 | 1.04 | 1.00 |
| Example 44 | 1.40 | 0.79 | 1.30 | 0.60 | 0.95 | 0.90 | 0.40 | 0.98 | 0.90 | 0.10 | 1.03 | 1.20 |
| Example 45 | 1.30 | 0.82 | 1.20 | 0.70 | 0.89 | 0.90 | 0.40 | 0.93 | 0.90 | 0.30 | 1.02 | 1.10 |
| Example 46 | 1.20 | 0.85 | 1.10 | 0.90 | 0.85 | 0.90 | 0.60 | 0.91 | 0.90 | 0.40 | 1.01 | 1.10 |
| Example 47 | 1.47 | 0.75 | 1.70 | 0.87 | 0.83 | 0.70 | 0.60 | 0.90 | 0.90 | 0.20 | 1.10 | 1.20 |
| Example 48 | 1.33 | 0.79 | 1.80 | 0.73 | 0.87 | 0.80 | 0.47 | 0.93 | 0.90 | 0.33 | 1.08 | 1.20 |
| Example 49 | 1.27 | 0.83 | 1.30 | 0.60 | 0.88 | 0.70 | 0.47 | 0.96 | 0.90 | 0.27 | 1.05 | 1.20 |
| Example 50 | 1.40 | 0.91 | 1.50 | 0.80 | 0.93 | 0.80 | 0.20 | 0.97 | 0.90 | 0.00 | 1.01 | 1.00 |

TABLE 6-continued

|  | Mg-rich/Ni-poor region | | | Mg/Ni-containing region 1 | | | Mg/Ni-containing region 2 | | | Mg/Ni-containing region 3 | | |
| --- | --- | --- | --- | --- | --- | --- | --- | --- | --- | --- | --- | --- |
|  | Mg/Mg in powder | Ni/Ni in powder | Al/Al in powder | Mg/Mg in powder | Ni/Ni in powder | Al/Al in powder | Mg/Mg in powder | Ni/Ni in powder | Al/Al in powder | Mg/Mg in powder | Ni/Ni in powder | Al/Al in powder |
| Example 51 | 1.20 | 0.87 | 1.40 | 0.80 | 0.91 | 0.80 | 0.60 | 0.93 | 0.80 | 0.20 | 1.06 | 1.10 |
| Example 52 | 1.20 | 0.83 | 1.40 | 0.80 | 0.85 | 0.80 | 0.60 | 0.90 | 0.90 | 0.40 | 1.04 | 1.10 |

TABLE 7

|  | Thickness of Mg-rich/Ni-poor region (μm) | Long axis diameter of Mg-rich/Ni-poor region (μm) | Proportion of Mg-rich/Ni-poor region in circumferential length of alloy powder (%) | Discharge capacity (mAh/g) | | | Cycle characteristics |
| --- | --- | --- | --- | --- | --- | --- | --- |
|  |  |  |  | 1st | 2nd | 3rd |  |
| Example 1 | 6 | 30 | 18 | 308 | 347 | 356 | 93 |
| Example 2 | 5 | 18 | 12 | 305 | 344 | 354 | 92 |
| Example 3 | 18 | 39 | 27 | 312 | 348 | 359 | 90 |
| Example 4 | 3 | 11 | 5 | 297 | 332 | 342 | 92 |
| Example 5 | 1 | 12 | 4 | 299 | 335 | 345 | 96 |
| Example 6 | 3 | 15 | 6 | 302 | 336 | 347 | 95 |
| Example 7 | 3 | 14 | 6 | 300 | 335 | 345 | 95 |
| Example 8 | 3 | 14 | 8 | 301 | 330 | 342 | 96 |
| Example 9 | 7 | 27 | 20 | 309 | 346 | 357 | 92 |
| Example 10 | 5 | 22 | 18 | 312 | 348 | 359 | 93 |
| Example 11 | 6 | 26 | 16 | 308 | 347 | 357 | 93 |
| Example 12 | 6 | 28 | 17 | 307 | 346 | 355 | 92 |
| Example 13 | 4 | 19 | 12 | 300 | 338 | 349 | 94 |
| Example 14 | 4 | 16 | 11 | 297 | 330 | 340 | 90 |
| Example 15 | 3 | 14 | 9 | 294 | 328 | 338 | 90 |
| Example 16 | 4 | 19 | 14 | 296 | 332 | 341 | 93 |
| Example 17 | 6 | 31 | 22 | 306 | 345 | 355 | 89 |
| Example 18 | 6 | 29 | 22 | 306 | 342 | 354 | 89 |

TABLE 8

|  | Thickness of Mg-rich/Ni-poor region (μm) | Long axis diameter of Mg-rich/Ni-poor region (μm) | Proportion of Mg-rich/Ni-poor region in circumferential length of alloy powder (%) | Discharge capacity (mAh/g) | | | Cycle characteristics |
| --- | --- | --- | --- | --- | --- | --- | --- |
|  |  |  |  | 1st | 2nd | 3rd |  |
| Example 19 | 9 | 33 | 23 | 309 | 347 | 357 | 89 |
| Example 20 | 16 | 37 | 25 | 314 | 349 | 360 | 89 |
| Example 21 | 10 | 21 | 27 | 307 | 347 | 357 | 90 |
| Example 22 | 11 | 24 | 27 | 305 | 346 | 355 | 92 |
| Example 23 | 5 | 18 | 14 | 300 | 335 | 347 | 91 |
| Example 24 | 8 | 30 | 22 | 304 | 342 | 353 | 91 |
| Example 25 | 8 | 32 | 24 | 306 | 344 | 354 | 93 |
| Example 26 | 24 | 49 | 29 | 318 | 354 | 364 | 88 |
| Example 27 | 4 | 15 | 12 | 301 | 338 | 348 | 91 |
| Example 28 | 4 | 17 | 15 | 300 | 338 | 347 | 91 |
| Example 29 | 2 | 13 | 9 | 300 | 337 | 346 | 92 |
| Example 30 | 5 | 19 | 13 | 304 | 337 | 348 | 92 |
| Example 31 | 4 | 12 | 10 | 299 | 335 | 345 | 92 |
| Example 32 | 5 | 12 | 10 | 299 | 337 | 346 | 92 |
| Example 33 | 30 | 47 | 24 | 312 | 349 | 359 | 86 |
| Example 34 | 20 | 57 | 25 | 314 | 351 | 362 | 86 |
| Example 35 | 18 | 33 | 42 | 316 | 352 | 364 | 85 |
| Example 36 | 31 | 59 | 48 | 318 | 355 | 366 | 84 |

TABLE 9

| | Thickness of Mg-rich/Ni-poor region (μm) | Long axis diameter of Mg-rich/Ni-poor region (μm) | Proportion of Mg-rich/Ni-poor region in circumferential length of alloy powder (%) | Discharge capacity (mAh/g) | | | Cycle characteristics |
|---|---|---|---|---|---|---|---|
| | | | | 1st | 2nd | 3rd | |
| Example 37 | 4 | 16 | 11 | 305 | 343 | 353 | 94 |
| Example 38 | 1 | 10 | 3 | 296 | 329 | 340 | 90 |
| Example 39 | 4 | 14 | 11 | 295 | 327 | 338 | 90 |
| Example 40 | 9 | 21 | 19 | 305 | 346 | 356 | 90 |
| Example 41 | 2 | 8 | 5 | 298 | 329 | 353 | 94 |
| Example 42 | 7 | 14 | 7 | 308 | 349 | 358 | 93 |
| Example 43 | 12 | 34 | 18 | 315 | 354 | 364 | 91 |
| Example 44 | 15 | 13 | 7 | 321 | 358 | 369 | 90 |
| Example 45 | 13 | 12 | 6 | 319 | 356 | 367 | 91 |
| Example 46 | 8 | 10 | 5 | 315 | 353 | 365 | 93 |
| Example 47 | 23 | 28 | 13 | 327 | 359 | 368 | 90 |
| Example 48 | 20 | 26 | 12 | 322 | 357 | 366 | 91 |
| Example 49 | 17 | 22 | 10 | 318 | 355 | 364 | 92 |
| Example 50 | 6 | 12 | 6 | 302 | 342 | 354 | 98 |
| Example 51 | 4 | 11 | 5 | 300 | 340 | 353 | 96 |
| Example 52 | 5 | 9 | 4 | 299 | 338 | 353 | 96 |
| Comp. Ex. 1 | — | — | — | 277 | 328 | 338 | 83 |
| Comp. Ex. 2 | — | — | — | 247 | 317 | 318 | 83 |
| Comp. Ex. 3 | — | — | — | 278 | 325 | 335 | 84 |

What is claimed is:

1. Hydrogen storage alloy powder of a composition represented by formula (1):

$R_{1-a}Mg_aNi_bAl_cM_d$ wherein R is at least one element selected from the group consisting of rare earth elements including Sc and Y, Zr, and Hf; M is at least one element selected from elements other than R, Mg, Ni, Al, and Ca, a satisfies 0.005≤a≤0.40, b satisfies 3.00≤b≤4.50, c satisfies 0≤c≤0.50, d satisfies 0≤d≤1.00, and b+c+d satisfies 3.00≤b+c+d≤4.50, wherein said alloy powder has at its outermost surface a Mg-rich/Ni-poor region wherein a Mg molar ratio is higher than that in the formula (1) (value represented by a in the formula (1)) and a Ni molar ratio is lower than that in the formula (1) (value represented by b in the formula (1)), and has inside a Mg/Ni-containing region wherein a Mg molar ratio is lower than that of said Mg-rich/Ni-poor region and a Ni molar ratio is higher than that of said Mg-rich/Ni-poor region.

2. The hydrogen storage alloy powder according to claim 1, wherein said Mg-rich/Ni-poor region has a composition with a Mg molar ratio not less than 1.05 times and not more than 1.50 times the Mg molar ratio in the formula (1), and a Ni molar ratio not less than 0.50 times and not more than 0.95 times the Ni molar ratio in the formula (1).

3. The hydrogen storage alloy powder according to claim 1, wherein as said Mg/Ni-containing region, at least two regions having compositions with different Mg molar ratios are present.

4. The hydrogen storage alloy powder according to claim 3, wherein said at least two regions of the Mg/Ni-containing region comprise regions (a) and (b), wherein region (a) is of a composition with a Mg molar ratio not less than 0 time and not more than 0.50 times the Mg molar ratio in the formula (1), and region (b) is of a composition with a Mg molar ratio more than 0.50 times and not more than 0.95 times the Mg molar ratio in the formula (1).

5. The hydrogen storage alloy powder according to claim 3, wherein said Mg-rich/Ni-poor region and said at least two Mg/Ni-containing regions indicate concentration gradients of decreasing Mg molar ratio and increasing Ni molar ratio from the outermost surface toward the center of the alloy powder.

6. The hydrogen storage alloy powder according to claim 3, wherein said at least two regions of the Mg/Ni-containing region comprise regions (a') and (b'), wherein said region (a') is of a composition with an Al molar ratio not less than 1.20 times and not more than 2.00 times the Al molar ratio in the formula (1), and said region (b') is of a composition with an Al molar ratio not less than 0.50 times and not more than 1.00 time the Al molar ratio in the formula (1), with said region (a') being present in insular manner, surrounded by said region (b').

7. The hydrogen storage alloy powder according to claim 1, wherein said Mg-rich/Ni-poor region is present as a region having a thickness of not less than 2 μm and not more than 40 μm, as measured from the outermost surface toward the center of the alloy powder.

8. The hydrogen storage alloy powder according to claim 1, wherein said Mg-rich/Ni-poor region has a composition with an Al molar ratio higher than that in the formula (1) (value represented by c in the formula (1)), and said Mg/Ni-containing region comprises a region having a composition with an Al molar ratio lower than that in the Mg-rich/Ni-poor region.

9. The hydrogen storage alloy powder according to claim 1, wherein said Mg-rich/Ni-poor region has a composition with an Al molar ratio not less than 1.05 times and not more than 2.00 times the Al molar ratio in the formula (1).

10. The hydrogen storage alloy powder according to claim 1 wherein, in the formula (1), a satisfies 0.01≤a≤0.15, b satisfies 3.00≤b≤3.80, c satisfies 0.05≤c≤0.50, d satisfies 0≤d≤1.00, and b+c+d satisfies 3.00≤b+c+d≤3.80.

11. The hydrogen storage alloy powder according to claim 1, wherein said alloy powder has a mean volume diameter of 20 to 100 μm.

12. An anode active material for a nickel-hydrogen rechargeable battery consisting of the hydrogen storage alloy powder according to claim 1.

13. An anode for a nickel-hydrogen rechargeable battery comprising the anode active material according to claim 12.

14. A nickel-hydrogen rechargeable battery comprising the anode for a nickel-hydrogen rechargeable battery according to claim 13.

* * * * *